(12) United States Patent
Nishioka et al.

(10) Patent No.: US 11,038,590 B2
(45) Date of Patent: Jun. 15, 2021

(54) OPTICAL TRANSMISSION DEVICE AND OPTICAL TRANSMISSION SYSTEM

(71) Applicant: Mitsubishi Electric Corporation, Tokyo (JP)

(72) Inventors: Junya Nishioka, Tokyo (JP); Eisuke Haraguchi, Tokyo (JP); Akihiro Fujie, Tokyo (JP); Toshiyuki Ando, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/119,467

(22) Filed: Dec. 11, 2020

(65) Prior Publication Data

US 2021/0099230 A1 Apr. 1, 2021

Related U.S. Application Data

(63) Continuation of application No. PCT/JP2018/028679, filed on Jul. 31, 2018.

(51) Int. Cl.
*H04B 10/00* (2013.01)
*H04B 10/2507* (2013.01)
*H04B 10/2575* (2013.01)

(52) U.S. Cl.
CPC ..... *H04B 10/2507* (2013.01); *H04B 10/2575* (2013.01)

(58) Field of Classification Search
CPC .......... H04B 10/2575; H04B 10/25753; H04B 10/25752; H04B 10/25759;
(Continued)

(56) References Cited

U.S. PATENT DOCUMENTS

| 9,838,137 B2 * | 12/2017 | Lozhkin ........... H04B 10/25758 |
| 2006/0079290 A1 * | 4/2006 | Seto ..................... H01Q 3/2605 |
| | | 455/562.1 |
| 2013/0170840 A1 * | 7/2013 | Chang .............. H04B 10/25754 |
| | | 398/115 |

FOREIGN PATENT DOCUMENTS

| JP | 2013-42478 A | 2/2013 |
| JP | 2014-216804 A | 11/2014 |
| JP | 6045192 B2 | 12/2016 |

OTHER PUBLICATIONS

International Search Report for PCT/JP2018/028679 dated Oct. 16, 2018 and filed on Jul. 31, 2018.
(Continued)

*Primary Examiner* — Hanh Phan
(74) *Attorney, Agent, or Firm* — Birch, Stewart, Kolasch & Birch, LLP

(57) ABSTRACT

An optical transmission device includes: a controlled oscillator for outputting a calibration signal having an output frequency that corresponds to an input oscillation control signal; an electrical-to-optical conversion circuit for generating an optical transmission signal by superimposing a transmission signal in a radio frequency band and the calibration signal on an optical wave; an optical input and output unit for sending the optical transmission signal to an optical transmission path and receiving a reflection signal that is a part of the optical transmission signal from an optical reception device; an optical-to-electrical converter for converting the reflection signal into a radio frequency signal; a phase locked loop for generating the oscillation control signal so that radio frequency output of the optical-to-electrical converter is phase-locked with a reference signal input from a reference signal source; and a signal generation circuit for generating, as the transmission signal,
(Continued)

the radio frequency signal phase-locked with the calibration signal.

20 Claims, 12 Drawing Sheets

(58) Field of Classification Search
CPC ............... H04B 10/2507; H04B 10/40; H04B 10/5057; H04B 10/516; H04B 10/541; H04B 10/548; H04L 7/0075
USPC ... 398/115, 116, 66, 67, 68, 70, 71, 72, 158, 398/159, 135, 136, 137, 138, 139, 183, 398/188, 186, 194, 195, 154, 155, 162; 455/562.1, 561, 445, 422
See application file for complete search history.

(56) References Cited

OTHER PUBLICATIONS

Musha et al., "Robust and precise length correction of 25-km fiber for distribution of local oscillator", 2005 Digest of the LEOS Summer Topical Meetings, TuB4.4, 2005, pp. 123-124.

\* cited by examiner

OPTICAL TRANSMISSION DEVICE AND OPTICAL TRANSMISSION SYSTEM

CROSS REFERENCE TO RELATED APPLICATION

This application is a Continuation of PCT International Application No. PCT/JP2018/028679, filed on Jul. 31, 2018, which is hereby expressly incorporated by reference into the present application.

TECHNICAL FIELD

The present invention relates to signal transmission technology for converting a signal in a radio frequency band such as a microwave band into an optical signal and transmitting the optical signal through an optical transmission path such as an optical fiber.

BACKGROUND ART

In recent years, research and development have been conducted on signal transmission technology for converting a radio frequency signal in a radio frequency band such as a microwave band into an optical signal and transmitting the optical signal through an optical transmission path such as an optical fiber. In signal transmission technology called radio-over-fiber (RoF), an optical transmission device converts a signal in a radio frequency band into an optical signal and sends the optical signal to an optical fiber toward an optical reception device. The optical reception device can generate a reception signal (radio frequency signal) by detecting the optical signal received from the optical transmission device.

In such signal transmission technology, there is a disadvantage that deterioration of characteristics of the optical transmission path results in deterioration of the reception signal quality since the phase of the reception signal shifts. For example, in a case where an optical wave is propagated through an optical fiber of an RoF system, expansion and contraction of an optical propagation medium (optical fiber core) due to fluctuation of the ambient temperature around the optical fiber may cause the optical path length to fluctuate. Such fluctuation of the optical path length causes the phase of a reception signal to fluctuate. In order to stabilize the phase of a reception signal, it is necessary to compensate for the fluctuation of the optical path length.

In order to compensate for the fluctuation of the optical path length of the RoF system, for example, technology disclosed in Non-Patent Literature 1 is available. This technology suppresses the phase fluctuation of an optical wave using a phase detector that detects a phase error of the optical wave that has been propagated for a round-trip in an optical fiber, and a fiber stretcher that adjusts the actual length of the optical fiber so as to cancel the detected phase error.

However, in the technology disclosed in Non-Patent Literature 1, the adjustable range with respect to the fluctuation amount of the optical path length of the optical fiber is limited to the variable length range of the optical fiber by the fiber stretcher, which is on the order of millimeters. For example, assuming that a temperature variation coefficient of the delay time of the optical fiber is 100 ps/km/K, which is the reference value for a standard optical fiber, the adjustable range is 33 mm under the conditions of a transmission path length of 1 km and a temperature variation of 1K. This adjustable range of the fiber stretcher cannot always sufficiently compensate for the above fluctuation of the optical path length.

Patent Literature 1 (JP 2014-216804 A) discloses an RoF system capable of compensating for fluctuation of the optical path length of an optical fiber without using a fiber stretcher. In this RoF system, an optical transmission device (source) performs E/O conversion on an intermediate frequency (IF) signal that is a modulation signal such as a pulse modulation signal or a frequency chirp signal to generate a first optical signal, divides a local oscillation (LO) signal that is a continuous wave (CW) into a transmission LO signal and a phase comparison LO signal, and performs E/O conversion on the transmission LO signal to generate a second optical signal. The optical transmission device sends the first optical signal and the second optical signal to two respective optical fibers, or multiplexes the first optical signal and the second optical signal and sends the multiplexed signal to one optical fiber. An optical reception device (destination) performs O/E conversion on the first optical signal received from the optical transmission device to generate a reception IF signal, and reflects a part of the second optical signal received from the optical transmission device to send back the part of the second optical signal to the optical transmission device while performing O/E conversion on the rest of the second optical signal to generate a reception LO signal. The optical reception device frequency-converts the reception IF signal by mixing the reception LO signal and the reception IF signal to obtain a reception signal.

The optical transmission device disclosed in Patent Literature 1 is capable of compensating for the fluctuation of the optical path length of the optical fiber using a part of the second optical signal returned from the optical reception device. That is, the optical transmission device includes: O/E conversion means for converting a part of the second optical signal returned from the optical reception device into a radio frequency signal (hereinafter referred to as "round-trip LO signal"); a microwave mixer for doubling the round-trip LO signal by mixing the round-trip LO signal and the phase comparison LO signal; frequency dividing means for dividing an output signal of the microwave mixer; phase comparison means for detecting a phase error between the output signal of the frequency dividing means and a reference signal; a loop filter for limiting the band of an error signal indicating the detected phase error and generating a control voltage; and a voltage-controlled oscillator (VCO) for outputting, as the LO signal, an oscillation signal having a frequency and a phase that correspond to the control voltage. As described above, since the optical transmission device includes a phase locked loop that synchronizes the phase of the round-trip LO signal with the phase of the reference signal, it is possible in the optical reception device to suppress the phase fluctuation of the reception LO signal caused by fluctuation of the optical path length of the optical fiber.

CITATION LIST

Patent Literature

Patent Literature 1: JP 2014-216804 A (see, for example, FIGS. 1 and 2 and paragraphs [0022] to [0028])

Non-Patent Literature

Non-Patent Literature 1: M. Musha, Y. Sato, K. Nakagawa, K. Ueda, A. Ueda, and M. Ishiguro, "Robust and precise length correction of 25-km fiber for distribution of local oscillator," 2005 Digest of LEOS Summer Topical meetings, TuB4.4, pp. 123-124, 2005.

SUMMARY OF INVENTION

Technical Problem

With the configuration disclosed in Patent Literature 1, although it is possible to suppress the phase fluctuation of the reception LO signal in the optical reception device (destination), it is difficult to suppress the phase fluctuation of the reception IF signal. Therefore, there is a disadvantage that as the optical transmission distance in the optical fiber becomes longer, or as the environmental fluctuation becomes larger, the amount of phase fluctuation of the reception IF signal becomes larger, thereby deteriorating the quality of reception signals.

In consideration of the above, an object of the present invention is to provide an optical transmission device and an optical transmission system capable of highly accurately compensating for fluctuation of the optical path length of an optical transmission path without using an optical path length adjusting member such as a fiber stretcher when a signal in a radio frequency band such as a microwave band is converted into an optical signal and the optical signal is transmitted through the optical transmission path.

Solution to Problem

An optical transmission device according to an aspect of the present invention converts a transmission signal in a radio frequency band lower than an optical frequency band into an optical transmission signal in the optical frequency band, and sends the optical transmission signal to an optical transmission path toward an optical reception device. The optical transmission device includes: a controlled oscillator for outputting a calibration signal having an output frequency that corresponds to an input oscillation control signal; an electrical-to-optical conversion circuit for generating the optical transmission signal by superimposing the transmission signal and the calibration signal on an optical wave; an optical input and output unit for sending the optical transmission signal to the optical transmission path and receiving a reflection signal that is a part of the optical transmission signal from the optical transmission path; an optical-to-electrical converter for converting the reflection signal into a radio frequency signal; a phase locked loop for generating a frequency conversion signal by shifting a frequency of an output of the optical-to-electrical converter using the calibration signal, and generating the oscillation control signal so that the frequency conversion signal is phase-locked with a reference signal input from a reference signal source; a signal generation circuit for generating a radio frequency signal phase-locked with the calibration signal as all or a part of the transmission signal; and a pulse generator for generating a pulse signal from an output of the signal generation circuit, wherein the electrical-to-optical conversion circuit generates the optical transmission signal by superimposing the pulse signal and the calibration signal on an optical wave.

Advantageous Effects of Invention

According to one aspect of the present invention, it is possible to highly accurately compensate for fluctuation of the optical path length of an optical transmission path without using an optical path length adjusting member such as a fiber stretcher.

DESCRIPTION OF EMBODIMENTS

Hereinafter, various embodiments of the present invention will be described in detail with reference to the drawings. Note that components denoted by the same symbol throughout the drawings have the same structure and the same function.

First Embodiment

Figure 1:
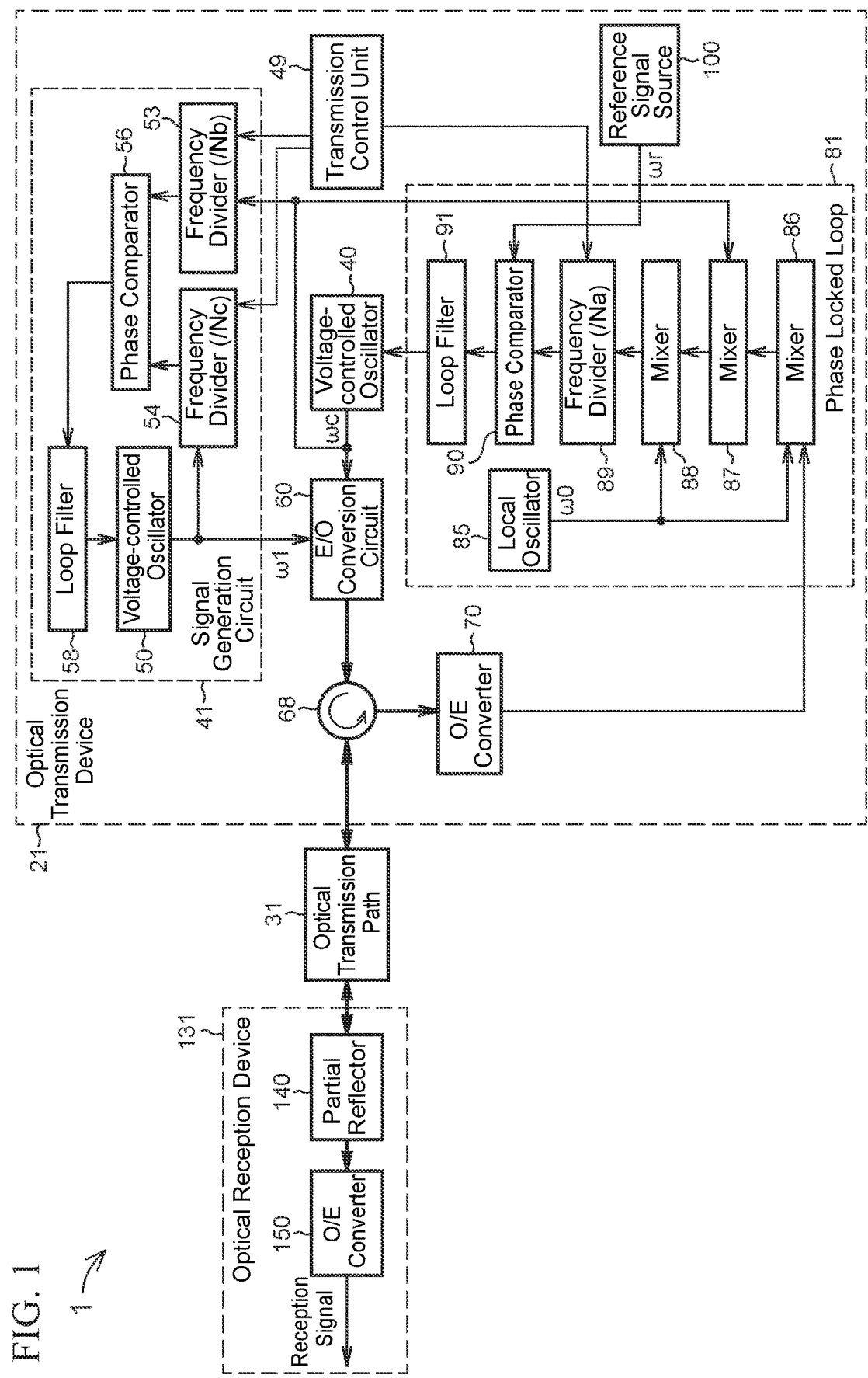
FIG. 1 is a block diagram illustrating a schematic configuration of an optical transmission system according to a first embodiment of the present invention.

FIG. 1 is a block diagram illustrating a schematic configuration of an optical transmission system 1 according to a first embodiment of the present invention. As illustrated in FIG. 1, the optical transmission system 1 includes: an optical transmission device 21 for converting a transmission signal in a radio frequency band lower than an optical frequency band (for example, a microwave band) into an optical transmission signal in an optical frequency band, and sending the optical transmission signal to an optical transmission path 31 toward an optical reception device 131; the optical transmission path 31 such as an optical fiber; and the optical reception device 131 for receiving the optical signal transmitted from the optical transmission device 21 via the optical transmission path 31.

The optical transmission device 21 includes: as illustrated in FIG. 1, a voltage-controlled oscillator (VCO) 40 for outputting a calibration signal having an output frequency $\omega c$ (angular frequency) depending on an input oscillation control signal; an electrical-to-optical conversion circuit (E/O conversion circuit) 60 for generating an optical transmission signal by superimposing a transmission signal in a radio frequency band and the calibration signal on an optical wave; an optical circulator 68 that functions as an optical input and output unit for receiving a reflection signal that is a part of the optical transmission signal from the optical transmission path 31 after the optical transmission signal has been sent to the optical transmission path 31; an optical-to-electrical converter (O/E converter) 70 for converting the reflection signal into a feedback signal to a phase locked loop 81; a reference signal source 100 for supplying a reference signal in the radio frequency band; the phase locked loop 81 for generating a frequency conversion signal by shifting the frequency of output from the optical-to-electrical converter 70 using the calibration signal supplied from the voltage-controlled oscillator 40, and generating an oscillation control signal so that the frequency conversion signal is phase-locked with the reference signal; a signal generation circuit 41 for generating, as a transmission signal, a radio frequency signal that is phase-locked with the calibration signal supplied from the voltage-controlled oscillator 40; and a transmission control unit 49 for controlling the operation of the signal generation circuit 41 and the phase locked loop 81.

The optical circulator 68 is one type of optical nonreciprocal elements. That is, the optical circulator 68 sends the optical transmission signal output from the electrical-to-optical conversion circuit 60 to the optical transmission path 31, but does not output the optical transmission signal to the optical-to-electrical converter 70. Meanwhile, the optical circulator 68 outputs a reflection signal (round-trip signal), reflected by the optical reception device 131, to the optical-to-electrical converter 70, but does not output the reflection signal to the electrical-to-optical conversion circuit 60 when receiving the reflection signal from the optical transmission path 31. Instead of the optical circulator 68, another type of optical nonreciprocal elements may be used.

The optical reception device 131 includes a partial reflector 140 for reflecting a part of the optical transmission signal input from the optical transmission path 31, and an optical-to-electrical converter (O/E converter) 150 for converting the optical signal transmitted by the partial reflector 140 into an electrical signal, that is, a reception signal.

The phase locked loop 81 includes a frequency conversion circuit for executing frequency conversion (self-frequency offset) using the calibration signal supplied from the voltage-controlled oscillator 40 to generate a frequency conversion signal and a control signal generating circuit for generating the oscillation control signal so that the frequency conversion signal is phase-locked with the reference signal. Specifically, as illustrated in FIG. 1, the frequency conversion circuit of the phase locked loop 81 includes: a local oscillator 85 for outputting a local oscillation signal having a frequency (angular frequency) $\omega 0$; a mixer 86 that functions as a down converter for shifting the output frequency $\omega c$ of the optical-to-electrical converter 70 downward in frequency by the frequency $\omega 0$ using the local oscillation signal; a mixer 87 that functions as an up converter for shifting the output frequency of the mixer 86 upward in frequency by the frequency $\omega c$ using the calibration signal; and a mixer 88 that functions as a down converter that shifts the output frequency of the mixer 87 downward in frequency by the frequency $\omega 0$ using the local oscillation signal.

The phase locked loop 81 further includes a frequency divider 89 for dividing the output (frequency conversion signal) of the mixer 88 by a frequency division number Na that is variably determined depending on a frequency division control signal input from the transmission control unit 49; a phase comparator 90 for detecting the phase difference between the output of the frequency divider 89 and the reference signal; and a loop filter 91 for generating the oscillation control signal to be supplied to the voltage-controlled oscillator 40 on the basis of an error signal indicating the detected phase difference. The phase comparator 90 and the loop filter 91 are included in the control signal generating circuit.

Note that although the frequency conversion is implemented by the three-stage configuration of the mixers 86 to 88 in the phase locked loop 81 in FIG. 1, the number of stages is not limited to three. Any number of stages may be used, and frequency conversion of each mixer in such a case may be either up conversion (frequency conversion of shifting the input frequency upward in frequency) or down conversion (frequency conversion of shifting the input frequency downward in frequency) depending on the application (phase amount to be corrected). Although frequency conversion using the local oscillator 85 is executed in the phase locked loop 81 in the frequency conversion in FIG. 1, such frequency conversion may not be executed in some embodiments. In addition, the frequency divider 89 in FIG. 1 divides the feedback signal before comparison of the phase and the frequency in the phase locked loop 81. The frequency division number Na at this point may be set to 1 so as not to perform the frequency division.

Next, the signal generation circuit 41 includes, for example as illustrated in FIG. 1, a programmable phase locked loop (PLL) circuit for outputting, as a transmission signal, a radio frequency signal having a variable frequency that corresponds to a control signal input from the transmission control unit 49 and phase-locked with the calibration signal. More specifically, as illustrated in FIG. 1, the signal generation circuit 41 includes: a voltage-controlled oscillator (PLL oscillation source) 50 for outputting, as a transmission signal, a radio frequency signal having an oscillation frequency that corresponds to the input control voltage; a frequency divider 53 (first frequency divider) for dividing the calibration signal by a frequency division number (first variable frequency division number) Nb that is variably determined depending on the control signal; a frequency divider 54 (second frequency divider) for dividing the output of the voltage-controlled oscillator 50 by a frequency division number (second variable frequency division number) Nc that is variably determined depending on the control signal; and a phase comparator 56 for detecting a phase difference between the output of the frequency divider 53 and the output of the frequency divider 54; and a loop filter 58 for generating a control voltage to be supplied to the voltage-controlled oscillator 50 on the basis of the output of the phase comparator 56. Here, either one or both of the frequency division numbers Nc and Nb may be set to 1 so as not to perform frequency division.

The partial reflector 140 is only required to include a configuration capable of reflecting a part of energy of a radio frequency signal superimposed on an optical transmission signal (for example, a modulation signal) as an optical signal. The partial reflector 140 can include, for example, an optical reflector.

Figure 2:
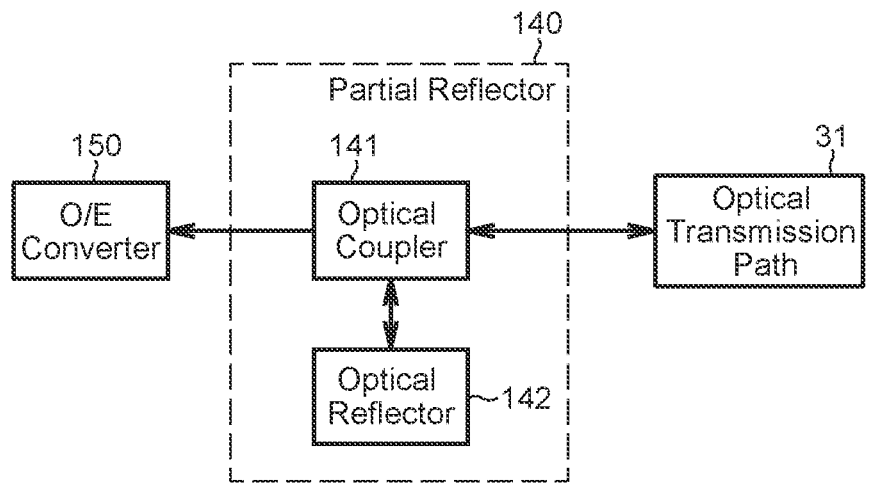
FIG. 2 is a diagram illustrating a first configuration example of a partial reflector of an optical reception device.

FIG. 2 is a diagram illustrating a configuration example of the partial reflector 140. The partial reflector 140 illustrated in FIG. 2 includes an optical coupler 141 for separating, from the optical transmission signal input from the optical transmission path 31, an optical wave to be output to the optical-to-electrical converter 150 and an optical wave to be output to an optical reflector 142, and the optical reflector 142 for reflecting the optical wave input from the optical coupler 141. The optical coupler 141 couples the optical wave reflected by the optical reflector 142 into the optical transmission path 31.

Figure 3:
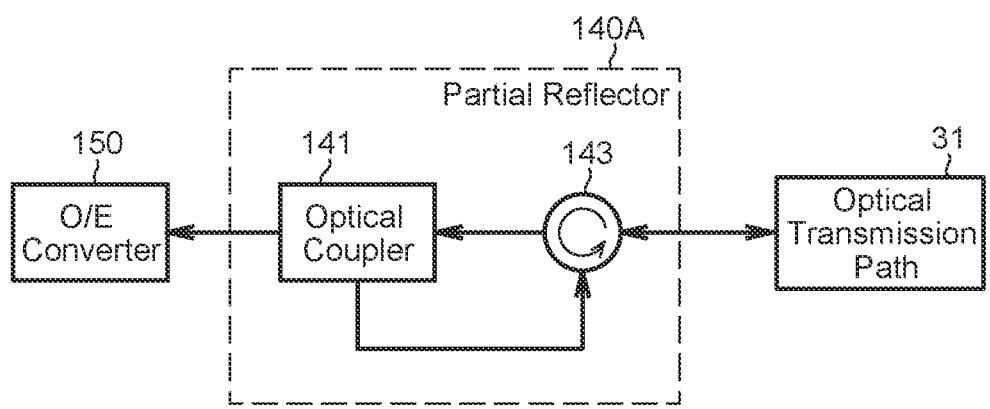
FIG. 3 is a diagram illustrating a second configuration example of the partial reflector of the optical reception device.
Figure 4:
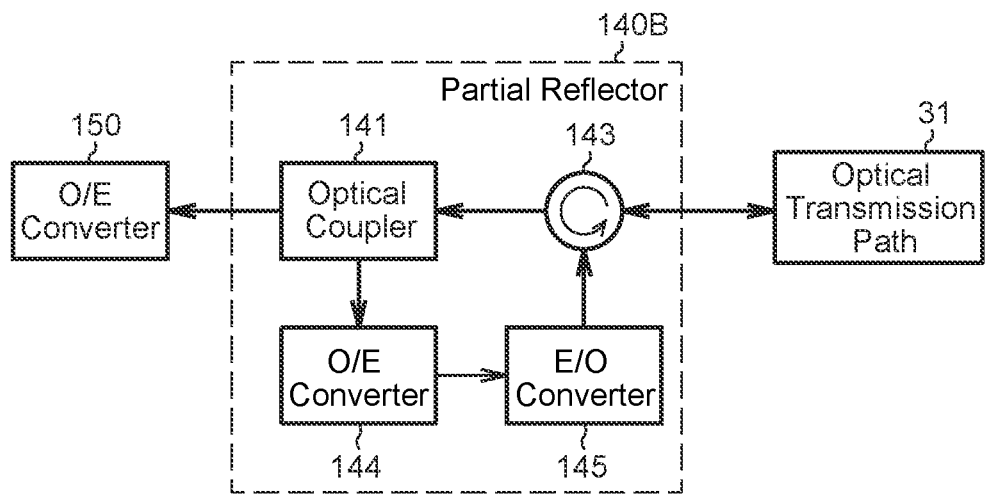
FIG. 4 is a diagram illustrating a third configuration example of the partial reflector of the optical reception device.
Figure 5:
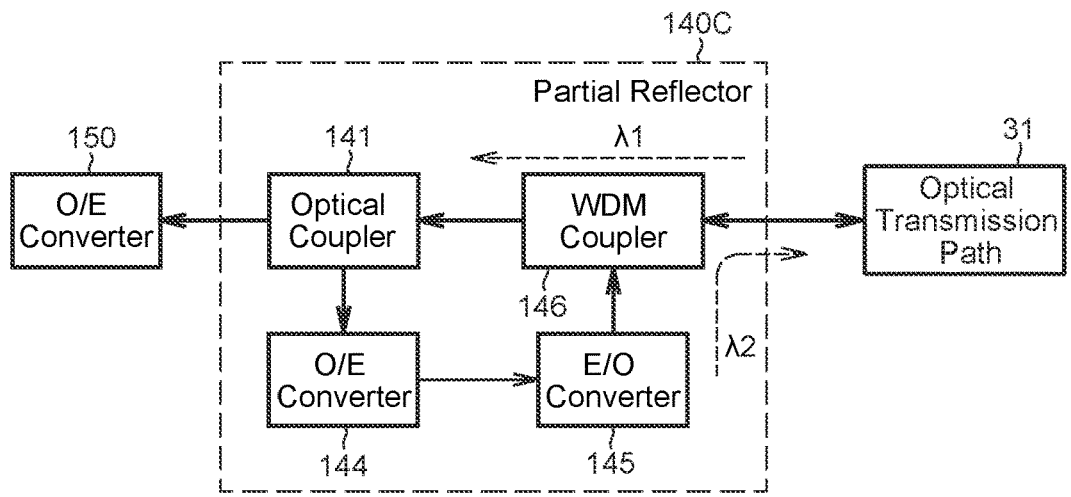
FIG. 5 is a diagram illustrating a fourth configuration example of the partial reflector of the optical reception device.

FIGS. 3 to 5 are diagrams illustrating other configuration examples of the partial reflector 140. A partial reflector 140A illustrated in FIG. 3 includes the optical coupler 141 and an optical circulator 143 for outputting the optical transmission signal input from the optical transmission path 31 to the optical coupler 141. The optical coupler 141 separates, from an optical wave input from the optical circulator 143, an optical wave to be output to the optical-to-electrical converter 150 and an optical wave to be fed back to the optical circulator 143. The optical circulator 143 couples the optical wave fed back from the optical coupler 141 into the optical transmission path 31. A partial reflector 140B illustrated in FIG. 4 further includes a optical-to-electrical converter 144 and an electrical-to-optical converter 145 in addition to the configuration of the partial reflector 140A. The optical-to-electrical converter 144 converts an optical wave fed back from the optical coupler 141 into an electric signal and outputs the electric signal to the electrical-to-optical converter 145. The electrical-to-optical converter 145 converts the electric signal into an optical signal and outputs the optical signal to the optical circulator 143. Meanwhile, a configuration of a partial reflector 140C illustrated in FIG. 5 is the same as that of the partial reflector 140B illustrated in FIG. 4 except that a wavelength division multiplexing (WDM) coupler 146 is included in place of the optical circulator 143 illustrated in FIG. 4. The WDM coupler 146 outputs, to the optical coupler 141, a component having a wavelength λ1 among optical waves having multiplexed wavelengths that are input from the optical circulator 143, and outputs, to the optical transmission path 31, a component having a wavelength λ2 among optical waves that are input from the electrical-to-optical converter 145. As the WDM coupler 146, a dense wavelength division multiplexing (DWDM) coupler may be used.

Figure 6:
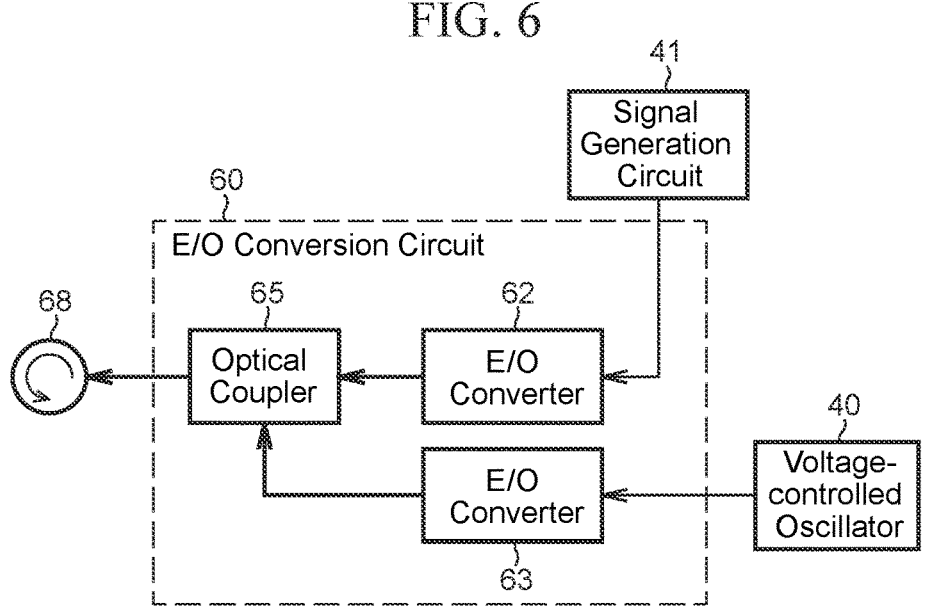
FIG. 6 is a diagram illustrating a first configuration example of an electrical-to-optical converter of the optical transmission device in the first embodiment.
Figure 7:
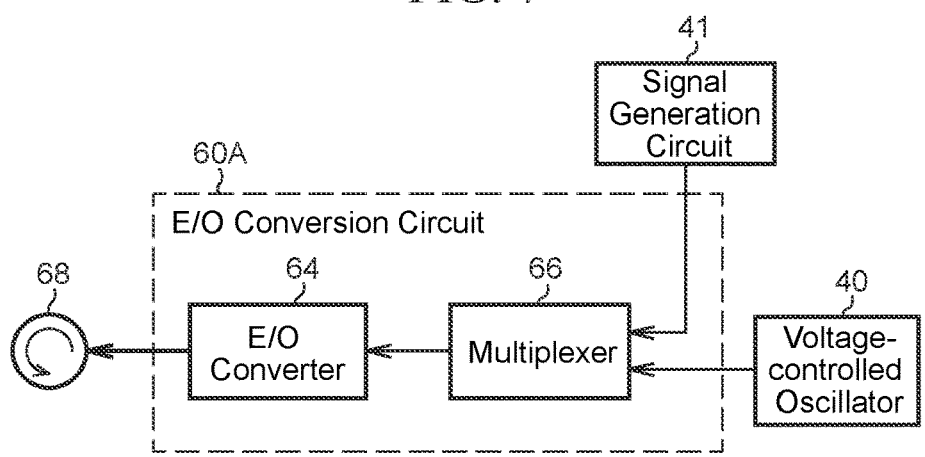
FIG. 7 is a diagram illustrating a second configuration example of the electrical-to-optical converter of the optical transmission device in the first embodiment.

FIG. 6 is a diagram illustrating a configuration example of the electrical-to-optical conversion circuit 60. The electrical-to-optical conversion circuit 60 includes, as illustrated in FIG. 6, an electrical-to-optical converter (first electrical-to-optical converter) 62 for converting a transmission signal input from the signal generation circuit 41 into an optical signal, an electrical-to-optical converter (second electrical-to-optical converter) 63 for converting the calibration signal input from the voltage-controlled oscillator 40 into an optical signal, and an optical coupler 65 for multiplexing the optical signals to generate an optical transmission signal. Alternatively, instead of the configuration example illustrated in FIG. 6, a configuration example illustrated in FIG. 7 may be used. An electrical-to-optical conversion circuit 60A illustrated in FIG. 7 includes a multiplexer 66 for multiplexing a transmission signal input from the signal generation circuit 41 and the calibration signal input from the voltage-controlled oscillator 40, and an electrical-to-optical converter 64 for converting the output of the multiplexer 66 into an optical transmission signal.

Meanwhile, as the electrical-to-optical converters 144, 145, 62, 63, and 64 included in the partial reflectors 140 and 140A to 140C and the electrical-to-optical conversion circuits 60 and 60A, direct modulation type electrical-to-optical converters that modulate an injection current of a laser light source may be used, or external modulation type electrical-to-optical converters that modulate output light of a laser light source by a modulator such as a Mach-Zehnder modulator or an electro-absorption optical modulator may be used. Alternatively, an integrated tunable laser assembly in which a plurality of electrical-to-optical converters is integrated may be used.

The optical-to-electrical converters 150, 70, and 144 can be each implemented by a photodiode, for example.

Next, the operation of the optical transmission system 1 according to the present embodiment will be described. Hereinafter, it is assumed that a microwave is used. First, the following relational Equations (1) generally hold between the phase φ and the angular frequency ω of a microwave.

$$\omega = \frac{d\phi}{dt} \quad (1)$$

$$\Delta\phi = \int \omega dt$$

Therefore, the phase fluctuation Δφ can be controlled by controlling the angular frequency ω. Hereinafter, the operation will be described assuming that the optical transmission path 31 is phase-stable (that is, ideally, there is no instantaneous phase fluctuation) except for the actual length fluctuation of the optical transmission path 31 such as an optical fiber. In addition, hereinafter, an "angular frequency" is simply referred to as a "frequency" in some cases.

The instantaneous frequency of the output (calibration signal) of the voltage-controlled oscillator 40 is defined as the following Expression (2).

$$\omega c + \frac{\Delta\phi_{c0}}{\Delta t} \quad (2)$$

Here, ωc denotes the oscillation frequency of the voltage-controlled oscillator 40, Δφ$_{c0}$ denotes a control phase component and a phase noise component of the output instantaneous frequency of the voltage-controlled oscillator 40 at the time of phase synchronization, and Δt denotes an infinitesimal time interval.

An output signal (frequency ωc) of the voltage-controlled oscillator 40 is converted into an optical signal by the electrical-to-optical conversion circuit 60 and transmitted to the partial reflector 140 via the optical circulator 68 and the optical transmission path 31. Then, the optical signal reflected by the partial reflector 140 is propagated again to the optical-to-electrical converter 70 via the optical transmission path 31 and the optical circulator 68, and is converted into an electric signal (feedback signal) by the optical-to-electrical converter 70. Here, the instantaneous phase fluctuation due to the actual length fluctuation of the optical transmission path 31 is defined as $\Delta\varphi_{*F}$. The instantaneous phase fluctuation $\Delta\varphi_{*F}$ has a different value depending on the frequency superimposed on the optical signal. At this point, the instantaneous frequency of an electric signal obtained by the optical-to-electrical converter 70 changes to an instantaneous frequency component expressed in the following Expression (3), affected by an amount for a round-trip of a phase fluctuation component $\Delta\varphi_{\omega cF}$ with respect to the frequency $\omega c$ of the optical transmission path 31.

$$\omega c + \frac{\Delta\phi_{c0}}{\Delta t} + 2\frac{\Delta\phi_{\omega cF}}{\Delta t} \qquad (3)$$

Here, the coefficient "2" related to $\Delta\varphi_{\omega cF}$ denotes the round-trip of the optical signal.

Next, regarding the configuration of the phase locked loop 81 illustrated in FIG. 1, the instantaneous frequency of an output signal (local oscillation signal) of the local oscillator 85 is defined by the following Expression (4).

$$\omega 0 + \frac{\Delta\phi_{00}}{\Delta t} \qquad (4)$$

Here, $\omega 0$ denotes the frequency of the local oscillator 85, and $\Delta\varphi_{00}$ denotes phase noise component of the local oscillator 85.

The mixer 86 generates a down conversion component by shifting the instantaneous frequency of output of the optical-to-electrical converter 70 downward in frequency by the instantaneous frequency of the local oscillation signal. The instantaneous frequency of the down conversion component obtained by the mixer 86 is given by the following Expression (5) (assuming $\omega c > \omega 0$).

$$\omega c - \omega 0 + \frac{\Delta\phi_{c0}}{\Delta t} + 2\frac{\Delta\phi_{\omega cF}}{\Delta t} - \frac{\Delta\phi_{00}}{\Delta t} \qquad (5)$$

Furthermore, the mixer 87 generates an up conversion component by shifting the instantaneous frequency of the output of the mixer 86 upward in frequency by the instantaneous frequency of the calibration signal. In the mixer 87, the up conversion component obtained by frequency conversion (self-frequency offset) using the output signal (calibration signal) of the voltage-controlled oscillator 40 is given by the following Expression (6).

$$2\omega c - \omega 0 + 2\frac{\Delta\phi_{c0}}{\Delta t} + 2\frac{\Delta\phi_{\omega cF}}{\Delta t} - \frac{\Delta\phi_{00}}{\Delta t} \qquad (6)$$

Furthermore, the mixer 88 generates an up conversion component by shifting the instantaneous frequency of the output of the mixer 87 upward in frequency by the instantaneous frequency of the local oscillation signal. In the mixer 88, the up conversion component obtained by frequency conversion using the output signal of the local oscillator 85 is given by the following Expression (7).

$$2\omega c + 2\left(\frac{\Delta\phi_{c0}}{\Delta t} + \frac{\Delta\phi_{\omega cF}}{\Delta t}\right) \qquad (7)$$

The frequency divider 89 divides the output signal of the mixer 88 by Na (divides by the frequency division number Na) to generate an instantaneous frequency component expressed by the following Expression (8).

$$\frac{2}{Na}\left(\omega c + \frac{\Delta\phi_{c0}}{\Delta t} + \frac{\Delta\phi_{\omega cF}}{\Delta t}\right) \qquad (8)$$

The instantaneous frequency of the reference signal generated by the reference signal source 100 is defined by the following Expression (9).

$$\omega r + \frac{\Delta\phi_{r0}}{\Delta t} \qquad (9)$$

Here, $\omega r$ and $\Delta\varphi_{r0}$ denote the frequency and the phase noise component of the reference signal generated by the reference signal source 100, respectively.

The phase comparator 90 compares the phases and frequencies of the output signal of the frequency divider 89 and the output signal of the reference signal source 100, and outputs an error signal indicating the comparison result. The loop filter 91 can establish phase synchronization by integrating the error signal and generating a control signal for the voltage-controlled oscillator 40. At this point, the phases and frequencies of Expressions (8) and (9) are compared, and phase synchronization is performed so that the following Equations (10) are satisfied.

$$\frac{2}{Na}\left(\omega c + \frac{\Delta\phi_{c0}}{\Delta t} + \frac{\Delta\phi_{\omega cF}}{\Delta t}\right) = \omega r + \frac{\Delta\phi_{r0}}{\Delta t} \qquad (10)$$
$$\omega c = \frac{Na}{2}\omega r, \frac{\Delta\phi_{c0}}{\Delta t} = \frac{Na}{2}\frac{\Delta\phi_{r0}}{\Delta t} - \frac{\Delta\phi_{\omega cF}}{\Delta t}$$

Next, the signal generation circuit 41 operates using the output signal of the voltage-controlled oscillator 40 as a reference signal. In a case where the configuration of the signal generation circuit 41 is the configuration illustrated in FIG. 1, the output signal of the voltage-controlled oscillator 40 is divided by the frequency divider 53. Assuming that the frequency division number of the frequency divider 53 in this case is Nb, the instantaneous frequency of the output signal of the frequency divider 53 is given by the following Expression (11).

$$\frac{1}{Nb}\left(\omega c + \frac{\Delta\phi_{c0}}{\Delta t}\right) \qquad (11)$$

The signal generation circuit 41 operates as a programmable PLL circuit. The instantaneous frequency of an output signal of the voltage-controlled oscillator (VCO) 50, which is the oscillation source of the signal generation circuit 41, is defined as the following Expression (12).

$$\omega 1 + \frac{\Delta\phi_{10}}{\Delta t} \qquad (12)$$

The output signal of the VCO 50 is input to the frequency divider 54 as a feedback signal within the signal generation circuit 41. Assuming that the frequency division number of the frequency divider 54 in this case is Nc, the instantaneous frequency of the output signal of the frequency divider 54 is given by the following Expression (13).

$$\frac{1}{Nc}\left(\omega 1 + \frac{\Delta\phi_{10}}{\Delta t}\right) \qquad (13)$$

The phase comparator 56 compares the phases and frequencies of the output signal of the frequency divider 53 and the output signal of the frequency divider 54, and outputs an error signal indicating the comparison result. The loop filter 58 can establish phase synchronization of the signal generation circuit 41 by integrating the error signal and generating a control signal for the VCO 50. At this point, the phases and frequencies of Expressions (11) and (13) are compared, and phase synchronization is performed so that the following Equations (14) are satisfied.

$$\frac{1}{Nb}\left(\omega c + \frac{\Delta\phi_{c0}}{\Delta t}\right) = \frac{1}{Nc}\left(\omega 1 + \frac{\Delta\phi_{10}}{\Delta t}\right) \qquad (14)$$

$$\omega 1 = \frac{Nc}{Nb}\omega c = \frac{Na \times Nc}{2Nb}\omega r,$$

$$\frac{\Delta\phi_{10}}{\Delta t} = \frac{Nc}{Nb}\frac{\Delta\phi_{c0}}{\Delta t} = \frac{Nc}{Nb}\left(\frac{Na}{2}\frac{\Delta\phi_{r0}}{\Delta t} - \frac{\Delta\phi_{\omega cF}}{\Delta t}\right)$$

The transmission signal output from the signal generation circuit 41 is converted into an optical signal by the electrical-to-optical conversion circuit 60, superimposed on an optical signal together with the calibration signal having the oscillation frequency of the voltage-controlled oscillator 40, and transmitted to the partial reflector 140 via the optical transmission path 31. The optical signal transmitted by the partial reflector 140 is converted into an electric signal (reception signal) by the optical-to-electrical converter 150. At this point, of the output signal of the optical-to-electrical converter 150, the component of the instantaneous frequency $\varphi 1 + \Delta\varphi_{10}/\Delta t$ of the output signal of the signal generation circuit 41 is subjected to a one-way phase fluctuation component $\Delta\varphi_{\omega 1F}$ for the frequency $\omega 1$ in the optical transmission path 31 and changes to an instantaneous frequency component expressed in the following Expression (15).

$$\omega 1 + \frac{\Delta\phi_{10}}{\Delta t} + \frac{\Delta\phi_{\omega 1F}}{\Delta t} \qquad (15)$$

Here, the phase fluctuation components in the optical transmission path 31 are mainly caused by the actual length fluctuation $\Delta L$ attributable to, for example, temperature fluctuation, vibration, or tension of the optical fiber included in the optical transmission path 31, and thus the following Equations (16) hold for phase fluctuation components with respect to frequencies $\omega c$ and $\omega 1$.

$$\Delta\phi_{\omega cF} = \omega c \frac{n\Delta L}{c}, \qquad (16)$$

$$\Delta\phi_{\omega 1F} = \omega 1 \frac{n\Delta L}{c} = \frac{\omega 1}{\omega c}\Delta\phi_{\omega cF}$$

Furthermore, since Equations (14) hold due to the phase synchronization, Expression (15) can be deformed into the following Equation (17).

$$\omega 1 + \frac{\Delta\phi_{10}}{\Delta t} + \frac{\omega 1}{\omega c}\frac{\Delta\phi_{\omega cF}}{\Delta t} = \qquad (17)$$

$$\frac{Na \times Nc}{2Nb}\omega r + \frac{Nc}{Nb}\left(\frac{Na}{2}\frac{\Delta\phi_{r0}}{\Delta t} - \frac{\Delta\phi_{\omega cF}}{\Delta t}\right) + \frac{Nc}{Nb}\frac{\Delta\phi_{\omega cF}}{\Delta t} =$$

$$\frac{Na \times Nc}{2Nb}\left(\omega r + \frac{\Delta\phi_{r0}}{\Delta t}\right)$$

Therefore, it can be understood that it is possible to transmit a transmission signal from which the fluctuation component of the optical transmission path 31 is removed. Since the frequency of the transmission signal can be determined by the frequency division numbers Nb and Nc of the signal generation circuit 41 and the band of the voltage-controlled oscillator 50 that is the oscillation source, it is possible to allow the frequency of the transmission signal to be variable and to have a wider band.

As described above, in the optical transmission system 1 according to the first embodiment, it is possible to transmit a phase-stable and wide-band frequency variable signal as a transmission signal. It is possible to accurately compensate for fluctuation of the optical path length of the optical transmission path 31 without using an optical path length adjusting member such as a fiber stretcher. Further, there is also an advantage that there is no need to change the design of the phase locked loop 81 for each transmission frequency, thereby enabling the design to be shared.

Furthermore, in the configuration of the first embodiment, since a frequency variable signal can be generated at the transmission source (optical transmission device 21), no phase locked loop nor a frequency conversion circuit for implementing a variable frequency is necessary at the transmission destination (optical reception device 131), and thus it is possible to simplify the circuit configuration of the transmission destination and to save power and to downsize the optical reception device 131.

Second Embodiment

Figure 8:
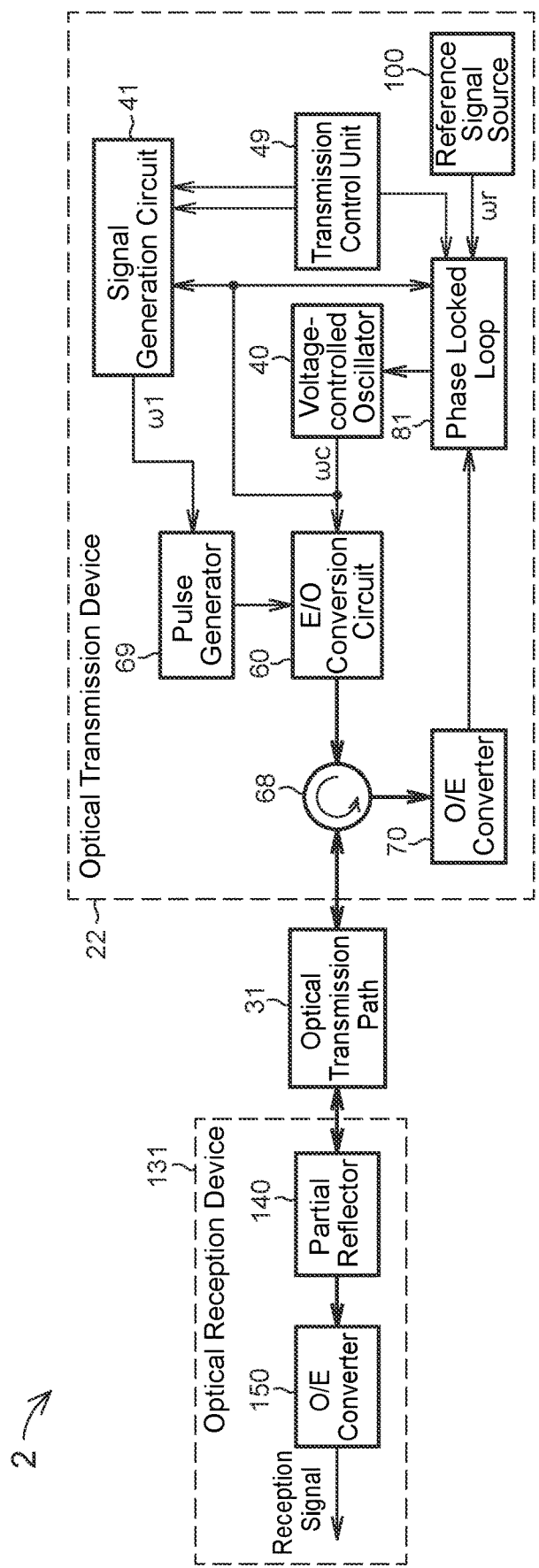
FIG. 8 is a block diagram illustrating a schematic configuration of an optical transmission system according to a second embodiment of the present invention.

Next, a second embodiment according to the present invention will be described. FIG. 8 is a block diagram illustrating a schematic configuration of an optical transmission system 2 according to the second embodiment of the present invention. The optical transmission system 2 of the present embodiment includes an optical transmission device 22, an optical transmission path 31, and an optical reception device 131. The optical transmission system 2 of the second embodiment is obtained by introducing, in the optical transmission system 1 of the first embodiment, a pulse generator 69 for generating a pulse signal from an output signal of a signal generation circuit 41 to the optical transmission device 22.

The pulse generator 69 can be implemented by, for example, an RF switch. Furthermore, for example, the pulse generator 69 can also be implemented by a function of multiplying output of the signal generation circuit 41 with a rectangular signal by using a mixer. When the signal generation circuit 41 is caused to oscillate in a similar manner to the operation of the optical transmission system 1 of the first embodiment, the output signal (oscillation signal) of the signal generation circuit 41 is pulsed by the pulse generator 69. An electrical-to-optical conversion circuit 60 generates, as an optical transmission signal, an optical signal on which the output signal (pulse signal) of the pulse generator 69 is superimposed. The optical transmission signal is transmitted to a optical-to-electrical converter 150 via an optical circulator 68 and the optical transmission path 31.

As described above, in the second embodiment, the optical transmission system 2 can be obtained which is capable of transmitting a pulse signal having the variable frequency and being phase-stable. In the first embodiment, in order to generate a pulse signal at the transmission destination, the transmission destination needs a pulsing means, and a pulsed timing signal needs to be separately transmitted. On the other hand, in the optical transmission system 2 according to the second embodiment, the pulse generator 69 of the transmission source (optical transmission device 22) executes the pulsing process, and thus the configuration of the optical reception device 131 of the transmission destination can be simplified and downsized.

Third Embodiment

Figure 9:
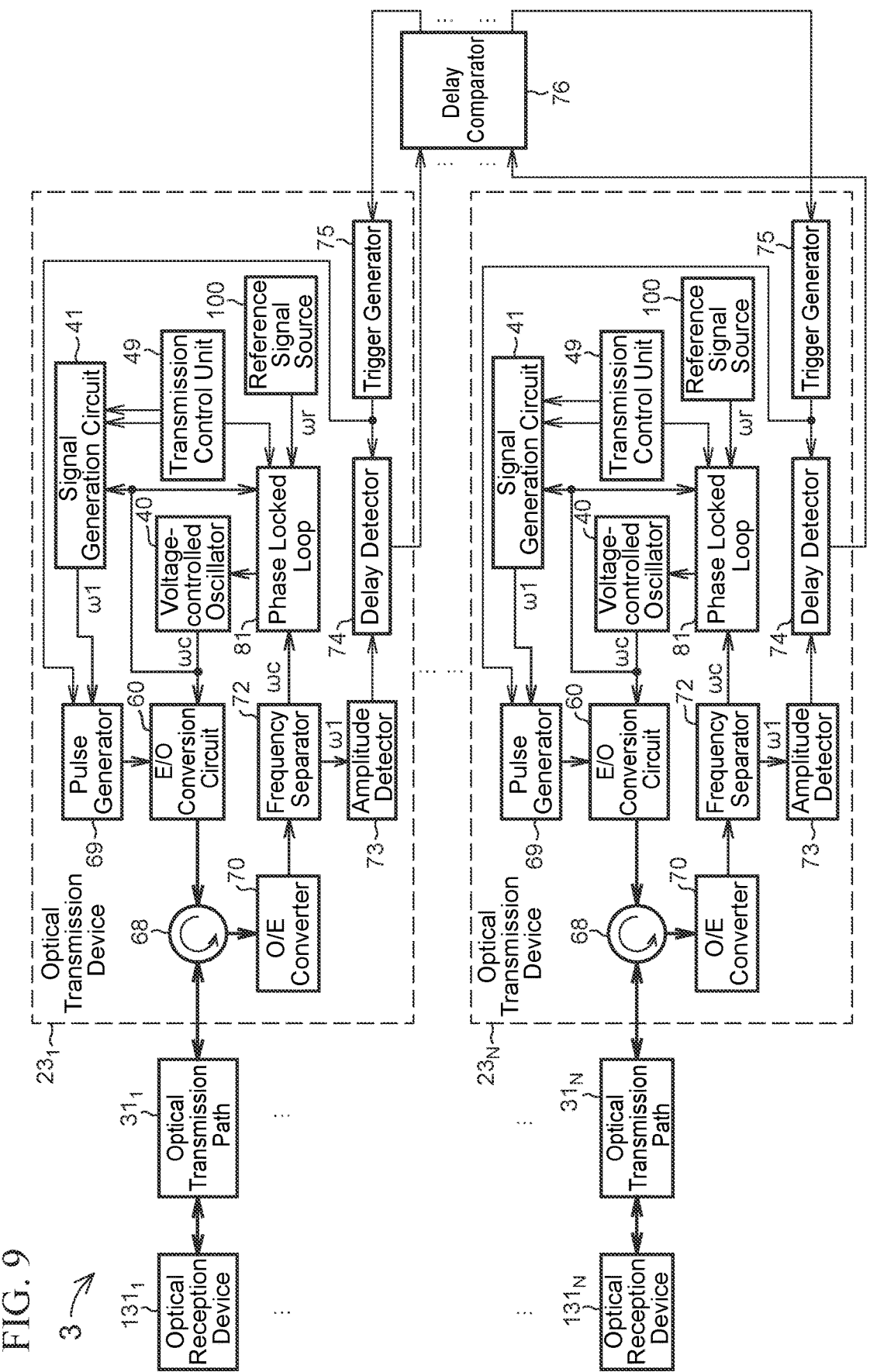
FIG. 9 is a block diagram illustrating a schematic configuration of an optical transmission system according to a third embodiment of the present invention.

Next, a third embodiment according to the present invention will be described. FIG. 9 is a block diagram illustrating a schematic configuration of an optical transmission system 3 according to the third embodiment of the present invention. As illustrated in FIG. 9, the optical transmission system 3 includes N optical transmission devices $23_1$ to $23_N$, optical transmission paths $31_1$ to $31_N$, such as optical fibers, connected to the optical transmission devices $23_1$ to $23_N$, respectively, N optical reception devices $131_1$ to $131_N$ connected to the optical transmission paths $31_1$ to $31_N$, respectively, and a delay comparator 76. Here, N is an integer greater than or equal to 2. The configuration of each of the optical reception devices $131_1$ to $131_N$ is the same as the configuration of the optical reception device 131 of the first embodiment.

The configuration of each of the optical transmission devices $23_1$ to $23_N$ in the optical transmission system 3 of the third embodiment is obtained by adding, to the configuration of the optical transmission device 22 in the optical transmission system 2 of the second embodiment, a trigger generator 75 for generating a trigger signal that designates pulse timing of the pulse generator 69, a frequency separator 72 for separating the component of a transmission signal frequency ω1 and the component of a calibration signal frequency ωc from a pulsed signal of a feedback signal output from the optical-to-electrical converter 70, and inputting the component of the calibration signal frequency ωc to the phase locked loop 81, an amplitude detector 73 for detecting the amplitude of the component of the transmission signal frequency ω1 separated by the frequency separator 72, and a delay detector 74 for detecting the transmission delay time of a corresponding optical transmission path from the rising edge of the trigger signal input from the trigger generator 75 and the rising edge of a pulse detected by the amplitude detector 73. In the optical transmission system 3 according to the present embodiment, the first to Nth optical transmission devices $23_1$ to $23_N$ are arranged as N systems in parallel.

The optical transmission system 3 also includes the delay comparator 76 which compares the transmission delay time detected by the delay detectors 74, . . . , 74 of the first to Nth optical transmission devices $23_1$ to $23_N$ with each other, and controls the timing (delay amount) in the trigger generators 75, . . . , 75 in the first to Nth optical transmission devices $23_1$ to $23_N$ on the basis of the delay time differences obtained as a result.

For example, the timing (trigger timing) for generating the trigger signals of the first optical transmission device $23_1$ and the Nth optical transmission device $23_N$ is defined as $t_1$ and $t_N$, respectively, with respect to time to. At this point, the delay comparator 76 can set the trigger timing $t_1$ and $t_N$ on the basis of the comparison result of the transmission delay times by the delay comparator 76. Now, let us assume that an output pulse signal from the pulse generator 69 in the first optical transmission device $23_1$ is converted into an optical signal by an electrical-to-optical conversion circuit 60, and is transmitted to a optical-to-electrical converter 150 via the optical transmission path $31_1$ at traveling time $T_1$. In this case, in the main element of the traveling time $T_1$, it is assumed that the delay amount other than the optical transmission path $31_1$ is negligible as the delay amount attributable to the length of the optical transmission path $31_1$. A component of the pulse signal, which is reflected by a partial reflector 140 in the optical reception device $131_1$ and converted into an electric signal by an optical-to-electrical converter 70 in the optical transmission device $23_1$ and then separated by the frequency separator 72, is detected by the amplitude detector 73. The timing for detecting a rising edge by the amplitude detector 73 is $t_1+2T_1$ in consideration of the round-trip of the optical signal in the optical transmission path $31_1$. Therefore, the transmission delay time for the trigger timing $t_1$ detected by the delay detector 74 is $2T_1$. Also, the timing at which a pulse signal component is output by the optical-to-electrical converter 150 of the optical reception device $131_1$ is $t_1+T_1$.

Similarly, let the transmission delay time of the optical transmission path $31_N$ corresponding to the Nth optical transmission device $23_N$ be $T_N$, the transmission delay time with respect to the trigger timing $t_N$ detected by the delay detector 74 of the Nth optical transmission device $23_N$ is $2T_N$, and the timing at which a pulse signal component is output by the optical-to-electrical converter 150 of the optical reception device $131_N$ is $t_N+T_N$.

Here, if the delay comparator 76 sets $t_N=t_1+T_1-T_N$ on the basis of the transmission delay time $2T_1$ and $2T_N$ detected by the delay detectors 74, 74 so that $t_1+T_1=t_N+T_N$ holds, the pulse signals output from the respective optical-to-electrical converters 150, 150 in the first optical reception device $131_1$ and the Nth optical reception device $131_N$ can be transmitted at the same timing.

Note that, although it is assumed that the main delay factor of the signal transmission paths is the transmission delay time of the optical transmission paths such as optical fibers, delay factors are not limited thereto. In a case where the delay due to the electric circuits and the optical circuits other than the optical transmission path are considered, the pulsing timing can be managed and controlled more strictly by measuring the delay amount of the electric circuits and the optical circuits in advance and correcting the offset of trigger timing to on the basis of the measured delay amount.

As described above, in the third embodiment, the optical transmission system 3 can be obtained which is capable of transmitting pulse signals having the variable frequency, being phase-stable, and capable of controlling the rising timing at the transmission destinations.

Furthermore, when the plurality of optical transmission devices $23_1$ to $23_N$ having the same configuration is arranged in parallel, it is possible to transmit phase-stable pulse signals to the optical reception devices $131_1$ to $131_N$, which are transmission destinations, at the same timing. In a case where the optical transmission paths $31_1$ to $31_N$ such as optical fibers have a long distance, despite that there are individual differences in the delay amount due to manufacturing errors of the optical transmission paths $31_1$ to $31_N$, it is possible to transmit pulse signals at the same timing.

Fourth Embodiment

Figure 10:
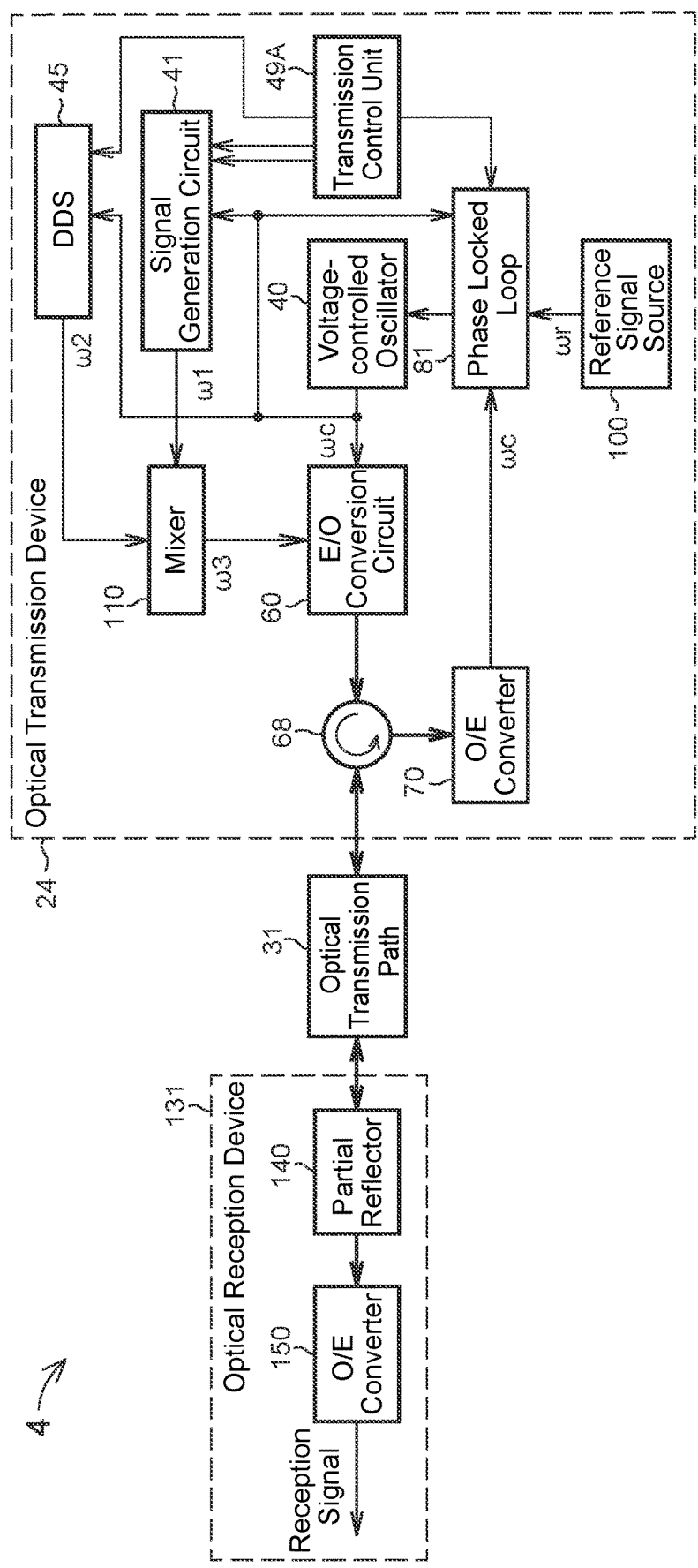
FIG. 10 is a block diagram illustrating a schematic configuration of an optical transmission system according to a fourth embodiment of the present invention.

Next, a fourth embodiment according to the present invention will be described. FIG. 10 is a block diagram illustrating a schematic configuration of an optical transmission system 4 according to the fourth embodiment of the present invention. As illustrated in FIG. 10, the optical transmission system 4 includes an optical transmission device 24, an optical transmission path 31, and an optical reception device 131.

The configuration of the optical transmission device 24 of the fourth embodiment is obtained by adding, to the configuration of the optical transmission device 22 of the first embodiment, a direct digital synthesizer (DDS) 45 that operates using an output signal of a voltage-controlled oscillator 40 as a clock signal (operating clock), a transmission control unit 49A for supplying a control signal for setting an operation state regarding, for example, the amplitude, the phase, a modulation method of this DDS 45, and a mixer (frequency mixer) 110 for frequency-mixing an output signal of a signal generation circuit 41 and an output signal of the DDS 45. The electrical-to-optical conversion circuit 60 receives a frequency-mixed component of the output signal of the signal generation circuit 41 and the output signal of the DDS 45, which is output from the mixer 110, instead of an output signal from the signal generation circuit 41. The transmission control unit 49A also has the same control function as the control function of the transmission control unit 49 of the first embodiment.

The oscillation operation of the voltage-controlled oscillator 40 is similar to that of the optical transmission system 1 of the first embodiment. The instantaneous frequency of the output signal of the DDS 45 is defined as the following Expression (18).

$$\omega 2 + \frac{\Delta \phi_{20}}{\Delta t} \quad (18)$$

Here, $\omega 2$ denotes the center frequency of the output signal of the DDS 45, and $\Delta \phi_{20}$ denotes the phase noise component of the DDS 45. The phase noise of the output signal of the DDS 45 is a value obtained by multiplying the phase noise of a clock signal by the ratio of the center frequency of the output signal of the DDS 45 and the center frequency of the clock signal, and thus where $\omega 2/\omega c$, the ratio of the center frequency of the output signal of the DDS 45 and the center frequency of the clock signal, is defined as D (D=$\omega 2/\omega c$), Expression (18) is expressed as in the following Expression (19).

$$D \times \omega c + D \frac{\Delta \phi_{c0}}{\Delta t} = \frac{Na \times D}{2} \omega_r + D \left( \frac{Na}{2} \frac{\Delta \phi_{r0}}{\Delta t} - \frac{\Delta \phi_{\omega cF}}{\Delta t} \right) \quad (19)$$

Next, the mixer 110 outputs an up-converted component having an instantaneous frequency expressed by the following Expression (20), for example by mixing the output signal of the signal generation circuit 41 and the output signal of the DDS 45.

$$\left( \omega 2 + \frac{\Delta \phi_{20}}{\Delta t} \right) + \left( \omega 1 + \frac{\Delta \phi_{10}}{\Delta t} \right) \quad (20)$$

When an output signal having the instantaneous frequency represented by Expression (20) is converted into an optical signal by the electrical-to-optical conversion circuit 60 and transmitted to a optical-to-electrical converter 150 of the optical reception device 131, the optical-to-electrical converter 150 outputs a signal having the instantaneous frequency of the following Expression (21) after being subjected to the phase fluctuation of a phase fluctuation component $\Delta \phi_{(\omega 1+\omega 2)F}$ with respect to the frequency $\omega 1+\omega 2$ of the optical transmission path 31.

$$\left( \omega 2 + \frac{\Delta \phi_{20}}{\Delta t} \right) + \left( \omega 1 + \frac{\Delta \phi_{10}}{\Delta t} \right) + \frac{\Delta \phi_{(\omega 1+\omega 2)F}}{\Delta t} \quad (21)$$

Here, the phase fluctuation components of the optical transmission path 31 are mainly caused by the actual length fluctuation $\Delta L$ attributable to, for example, temperature fluctuation, vibration, or tension of the optical fiber, and thus the following Equation (22) holds for phase fluctuation components with respect to frequencies $\omega c$ and $\omega 1$.

$$\Delta \phi_{(\omega 1+\omega 2)F} = \quad (22)$$
$$(\omega 1 + \omega 2) \frac{n \Delta L}{c} = \frac{(\omega 1 + \omega 2)}{\omega c} \omega c \frac{n \Delta L}{c} = \frac{(\omega 1 + \omega 2)}{\omega c} \Delta \phi_{\omega cF}$$

Expression (21) can be deformed into the following Equation (23).

$$\left( \omega 2 + \frac{\Delta \phi_{20}}{\Delta t} \right) + \left( \omega 1 + \frac{\Delta \phi_{10}}{\Delta t} \right) + \frac{(\omega 1 + \omega 2)}{\omega c} \frac{\Delta \phi_{\omega cF}}{\Delta t} = \quad (23)$$
$$\left( \omega 2 + \frac{\Delta \phi_{20}}{\Delta t} + D \frac{\Delta \phi_{\omega cF}}{\Delta t} \right) + \left( \omega 1 + \frac{\Delta \phi_{10}}{\Delta t} + \frac{\omega 1}{\omega c} \frac{\Delta \phi_{\omega cF}}{\Delta t} \right) =$$
$$\left\{ \frac{Na \times D}{2} \omega r + D \frac{Na}{2} \frac{\Delta \phi_{r0}}{\Delta t} - \frac{\Delta \phi_{\omega cF}}{\Delta t} \right) + D \frac{\Delta \phi_{\omega cF}}{\Delta t} \right\} +$$
$$\frac{Na \times Nc}{2Nb} \left( \omega r + \frac{\Delta \phi_{r0}}{\Delta t} \right) = \frac{Na}{2} \left( D + \frac{Nc}{Nb} \right) \left( \omega r + \frac{\Delta \phi_{r0}}{\Delta t} \right)$$

Therefore, the optical transmission system 4 of the present embodiment is capable of transmitting a phase-stable signal on the basis of the frequency and the phase noise of the reference signal generated by the reference signal source 100.

As described above, in the fourth embodiment, since the output frequency of the DDS 45 can be set by the resolution of the operation clock, it is possible to finely adjust the frequency of a frequency-variable transmission signal. Therefore, frequency selectivity is wider as compared to a case where only the signal generation circuit 41 is used. Furthermore, since the DDS 45 is not phase-synchronized and an offset phase can be set, in a case where a plurality of optical transmission systems 4 is used, it is possible to set the phase separately for each of the optical transmission systems 4.

Therefore, it is possible to implement pulsing by modulating the output amplitude of the DDS 45 and to perform phase-stable transmission of a modulation signal such as a chirp signal whose phase or frequency is chirped. Therefore, there is an effect that the optical transmission system 4 of the present embodiment can be applied to an application using a sophisticated modulation signal.

Fifth Embodiment

Figure 11:
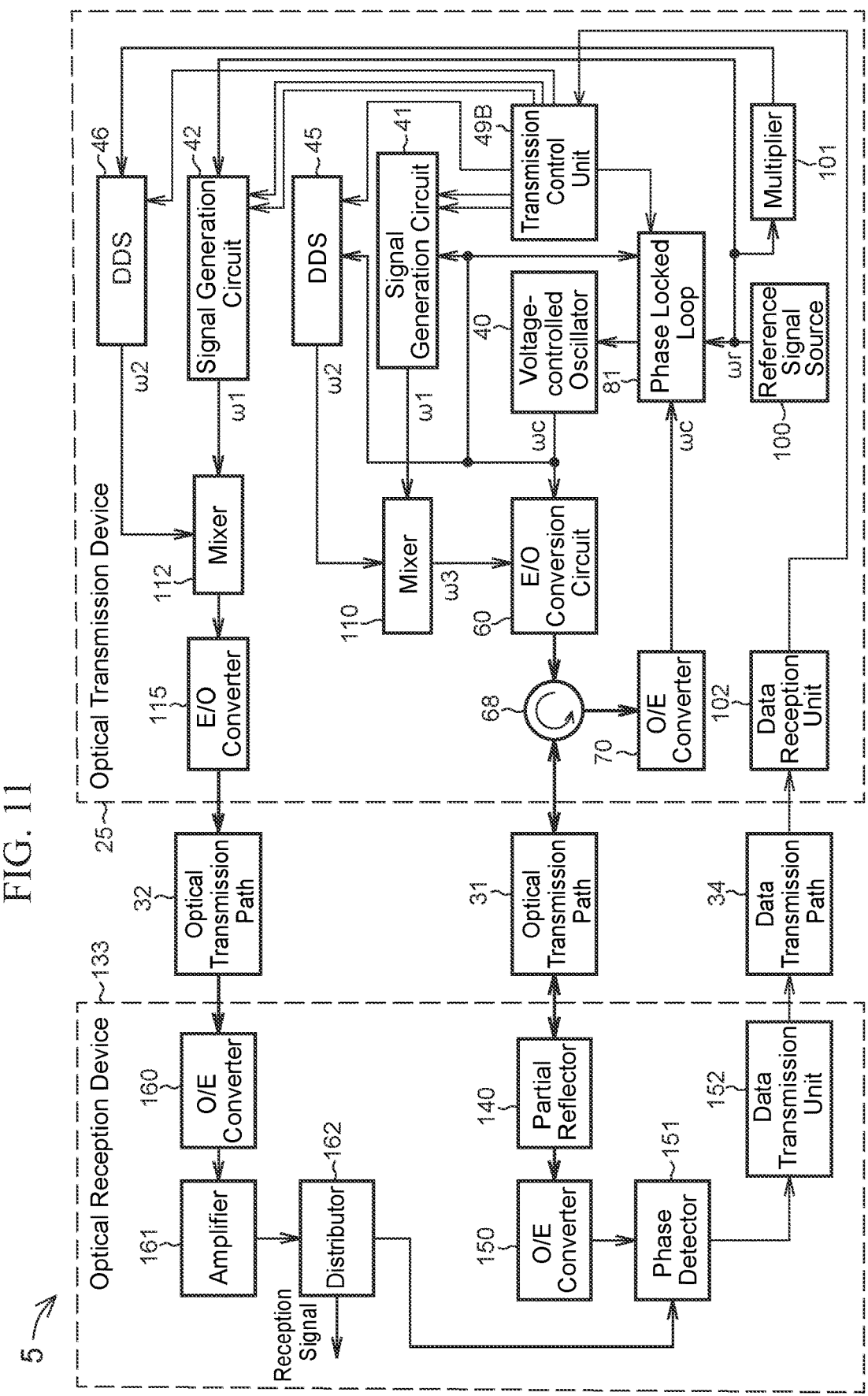
FIG. 11 is a block diagram illustrating a schematic configuration of an optical transmission system according to a fifth embodiment of the present invention.

Next, a fifth embodiment according to the present invention will be described. FIG. 11 is a block diagram illustrating a schematic configuration of an optical transmission system 5 according to the fifth embodiment of the present invention. As illustrated in FIG. 11, the optical transmission system 5 includes an optical transmission device 25, two systems of optical transmission paths (first and second optical transmission paths) 31 and 32, a data transmission path 34, and an optical reception device 133. The configuration of the optical transmission system 5 of the fifth embodiment is different from that of the optical transmission system 4 of the fourth embodiment in that the optical reception device 133, the optical transmission path 32, the data transmission path 34, a data reception unit 102, a multiplier 101, an electrical-to-optical converter 115, a mixer 112, a signal generation circuit 42, a DDS 46, and a transmission control unit 49B are included. A signal output from the optical-to-electrical converter 150 in the optical reception device 133 is similar to the signal output from the optical-to-electrical converter 150 in the fourth embodiment. The configuration of the signal generation circuit 42 is the same as that of the signal generation circuit 41.

As compared to the configuration of the optical transmission device 24 of the fourth embodiment, the optical transmission device 25 of the fifth embodiment further includes: the signal generation circuit 42 that is a programmable PLL circuit that is in phase synchronization with a reference signal generated by a reference signal source 100; the multiplier 101 for multiplying the reference signal generated by the reference signal source 100; the direct digital synthesizer (DDS) 46 for operating using an output signal of the multiplier 101 as a clock signal (operating clock); the mixer 112 for frequency-mixing an output signal of the signal generation circuit 42 and an output signal of the DDS 46; the electrical-to-optical converter 115 for converting output of the mixer 112 into an optical signal; and the optical transmission path 32, such as an optical fiber, for transmitting the optical signal output from the electrical-to-optical converter 115. The transmission control unit 49B has a control function of supplying a control signal for setting an operation state regarding, for example, the amplitude, the phase, and a modulation method of the DDS 46, and has the same control function as that of the transmission control unit 49A of the fourth embodiment. Meanwhile, the optical reception device 133 includes: a optical-to-electrical converter 160 for converting the optical signal transmitted from the optical transmission path 32 into an electric signal; an amplifier 161 for amplifying the signal output from the optical-to-electrical converter 160; a distributor 162 for distributing the output signal from the amplifier 161; a phase detector 151 for detecting a phase difference between output signals of the optical-to-electrical converter 150 and the distributor 162; a data transmission unit 152 for transmitting phase difference data indicating the phase difference detected by the phase detector 151; the data transmission path 34 for transmitting the phase difference data; and the data reception unit 102 for receiving the phase difference data transmitted by the data transmission path 34.

The data transmission unit 152 and the data reception unit 102 can be implemented by, for example, a digital optical transceiver (SFP+optical transceiver). In this case, the data transmission path 34 is implemented by an optical fiber. Note that the data transmission unit 152, the data reception unit 102, and the data transmission path 34 may be either a wired communication transmission path or a wireless communication transmission path, and may be either an optical signal communication transmission path or a wireless signal communication transmission path.

In the optical reception device 133, the instantaneous frequency of the signal output from the optical-to-electrical converter 150 is expressed by Equation (23) like in the fourth embodiment.

Meanwhile, the transmission control unit 49B sets the output signal frequency of the signal generation circuit 42 and the output signal frequency of the DDS 46 to be the same as the output signal frequency $\omega 1$ of the signal generation circuit 41 and the output signal frequency $\omega 2$ of the DDS 45, respectively. At this point, the instantaneous frequency of a signal frequency-converted by the mixer 112 is synchronized with the reference signal generated by the reference signal source 100, and is represented by the following Equation (24).

$$(\omega 1 + \omega 2) + \frac{\Delta \eta}{\Delta t} = K\left(\omega r + \frac{\Delta \phi_{r0}}{\Delta t}\right) \quad (24)$$

An output signal of the mixer 112 is converted into an optical signal by the electrical-to-optical converter 115, and undergoes phase fluctuation of a phase fluctuation component $\Delta \eta_{(\omega 1+\omega 2)F}$ with respect to the frequency $\omega 1+\omega 2$ of the optical transmission path 32. At this point, the electric signal output by the optical-to-electrical converter 160 of the optical reception device 133 is output so as to have the instantaneous frequency of the following Equation (25).

$$(\omega 1 + \omega 2) + \frac{\Delta \eta}{\Delta t} + \frac{\Delta \eta_{(\omega 1+\omega 2)F}}{\Delta t} = K\left(\omega r + \frac{\Delta \phi_{r0}}{\Delta t}\right) + \frac{\Delta \eta_{(\omega 1+\omega 2)F}}{\Delta t} \quad (25)$$

Next, the signal output from the optical-to-electrical converter 160 is amplified by the amplifier 161, distributed by the distributor 162, and input to the phase detector 151. Let the phase fluctuation component of the amplifier 161 be $\Delta \theta$, the instantaneous frequency of the signal input to the phase detector 151 is expressed by the following Equation (26).

$$(\omega 1 + \omega 2) + \frac{\Delta \eta}{\Delta t} + \frac{\Delta \eta_{(\omega 1+\omega 2)F}}{\Delta t} + \frac{\Delta \theta}{\Delta t} = \quad (26)$$
$$K\left(\omega r + \frac{\Delta \phi_{r0}}{\Delta t}\right) + \frac{\Delta \eta_{(\omega 1+\omega 2)F}}{\Delta t} + \frac{\Delta \theta}{\Delta t}$$

Therefore, the phase detected by the phase detector 151 is the difference between Equations (23) and (26), which is given by the following Expression (27).

$$K\left(\omega r + \frac{\Delta \phi_{r0}}{\Delta t}\right) + \frac{\Delta \eta_{(\omega 1+\omega 2)F}}{\Delta t} + \frac{\Delta \theta}{\Delta t} - \frac{Na}{2}\left(D + \frac{Nc}{Nb}\right)\left(\omega r + \frac{\Delta \phi_{r0}}{\Delta t}\right) \quad (27)$$

Here, since the frequencies of the signal generation circuits 41 and 42 match and the frequencies of the DDSs 45 and 46 match, the following Equation (28) is established.

$$K\left(\omega r + \frac{\Delta \phi_{r0}}{\Delta t}\right) = \frac{Na}{2}\left(D + \frac{Nc}{Nb}\right)\left(\omega r + \frac{\Delta \phi_{r0}}{\Delta t}\right) \quad (28)$$

Therefore, Expression (27) can be deformed to the following Expression (29). The phase detector 151 can detect a phase fluctuation component of the transmission path including the amplifier 161 with respect to the output signal of the mixer 112.

$$\frac{\Delta \eta_{(\omega 1 + \omega 2)F}}{\Delta t} + \frac{\Delta \theta}{\Delta t} \quad (29)$$

The transmission control unit 49B can set the next phase in the DDS 46 on the basis of Expression (29).

$-\Delta \eta_{(\omega 1+\omega 2)F}/\Delta t - \Delta \theta/\Delta t$

As a result, the output signal of distributor 162 has the instantaneous frequency as expressed by the following Expression (30), and thus phase-stable signal transmission can be performed.

$$K\left(\omega r + \frac{\Delta \phi_{r0}}{\Delta t}\right) \quad (30)$$

As described above, in the fifth embodiment, as compared with the fourth embodiment, it is possible to monitor and correct the phase fluctuation of the path outside the phase locked loop that controls the voltage-controlled oscillator 40. It is also possible to correct the phase fluctuation amount of an element having a large phase fluctuation due to the environment or the frequency, such as the amplifier 161. Furthermore, since the phase fluctuation amount component of the amplifier 161 can also be corrected, a high-output and phase-stable signal can be transmitted.

Sixth Embodiment

Figure 12:
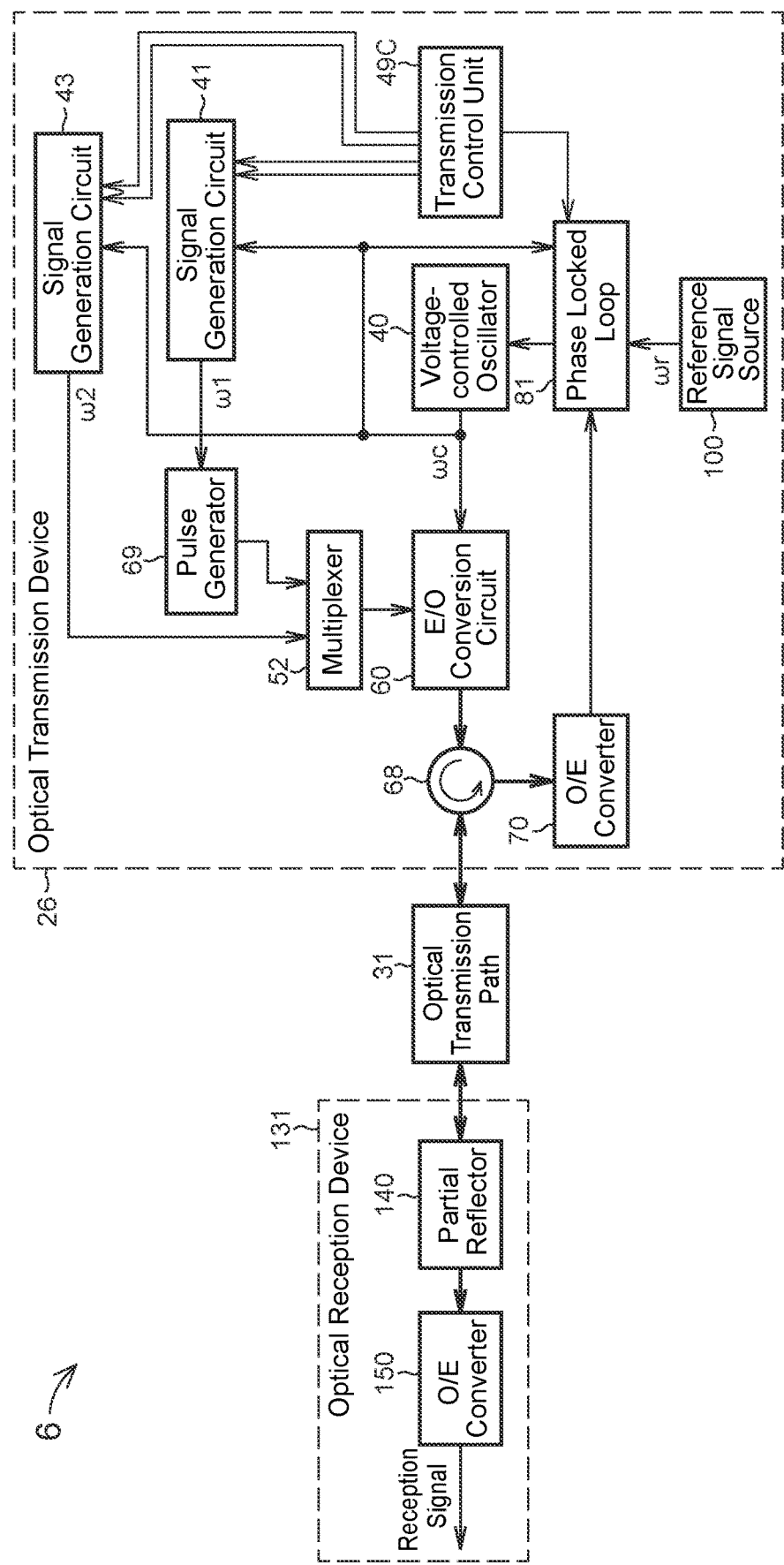
FIG. 12 is a block diagram illustrating a schematic configuration of an optical transmission system according to a sixth embodiment of the present invention.

Next, a sixth embodiment according to the present invention will be described. FIG. 12 is a block diagram illustrating a schematic configuration of an optical transmission system 6 according to the sixth embodiment of the present invention. As illustrated in FIG. 12, the optical transmission system 6 includes an optical transmission device 26, an optical transmission path 31, and an optical reception device 131.

The optical transmission device 26 of the sixth embodiment includes, like the optical transmission device 22 of the second embodiment, a reference signal source 100, a voltage-controlled oscillator 40, a signal generation circuit 41, a pulse generator 69, an electrical-to-optical conversion circuit 60, an optical circulator 68, and a optical-to-electrical converter 70. The optical transmission device 26 of the present embodiment further includes, in addition to the signal generation circuit 41 that is a programmable PLL circuit, a signal generation circuit 43 that is a programmable PLL circuit which uses an output signal of the voltage-controlled oscillator 40 as a reference signal, a multiplexer 52 for multiplexing a pulse signal output by the pulse generator 69 and an output signal of the signal generation circuit 43, and a transmission control unit 49C for controlling the operations of the signal generation circuits 41 and 43 and a phase locked loop 81. The configuration of the signal generation circuit 43 is the same as that of the signal generation circuit 41. The electrical-to-optical conversion circuit 60 receives the output signal of the multiplexer 52 instead of the output signal from the pulse generator 69.

In the configuration of the present embodiment, in the instantaneous frequency of a signal generated by the signal generation circuit 41, the phase fluctuation component of the optical transmission path 31 is removed by the optical-to-electrical converter 150 like in the first embodiment, which is expressed by the following Expression (31).

$$\frac{Na \times Nc}{2Nb}\left(\omega r + \frac{\Delta \phi_{r0}}{\Delta t}\right) \quad (31)$$

In addition, since the configuration of the signal generation circuit 43 is similar to the configuration of the signal generation circuit 41 of the first embodiment, for example, setting frequency division numbers of Mb and Mc in the signal generation circuit 43 instead of the frequency division numbers Nb and Nc gives the following Expression (32).

$$\frac{Na \times Mc}{2Mb}\left(\omega r + \frac{\Delta \phi_{r0}}{\Delta t}\right) \quad (32)$$

In the optical reception device 131, in a case where a photodiode is used as the optical-to-electrical converter 150, square law detection is performed on the transmission signal. Therefore, when an intensity-modulated optical signal is detected, the sum frequency component of Expressions (31) and (32) expressed by the following Equation (33) is also output.

$$\frac{Na \times Nc}{2Nb}\left(\omega r + \frac{\Delta \phi_{r0}}{\Delta t}\right) + \frac{Na \times Mc}{2Mb}\left(\omega r + \frac{\Delta \phi_{r0}}{\Delta t}\right) = \\ \frac{Na}{2}\left(\frac{Nc}{Nb} + \frac{Mc}{Mb}\right)\left(\omega r + \frac{\Delta \phi_{r0}}{\Delta t}\right) \quad (33)$$

Therefore, it is possible to cause the optical-to-electrical converter 150 of the transmission destination (optical reception device 131) to operation with an added function of frequency conversion.

As described above, in the sixth embodiment, the response frequency required for the electrical-to-optical conversion circuit 60 of the transmission source (optical transmission device 26) may be any frequency as long as the response has the output frequency of the signal generation circuits 41 and 43, and no frequency-converted response frequency is required. Therefore, the response frequency characteristics required for the electrical-to-optical conversion circuit 60 are relaxed, which contributes to cost reduction.

Seventh Embodiment

Figure 13:
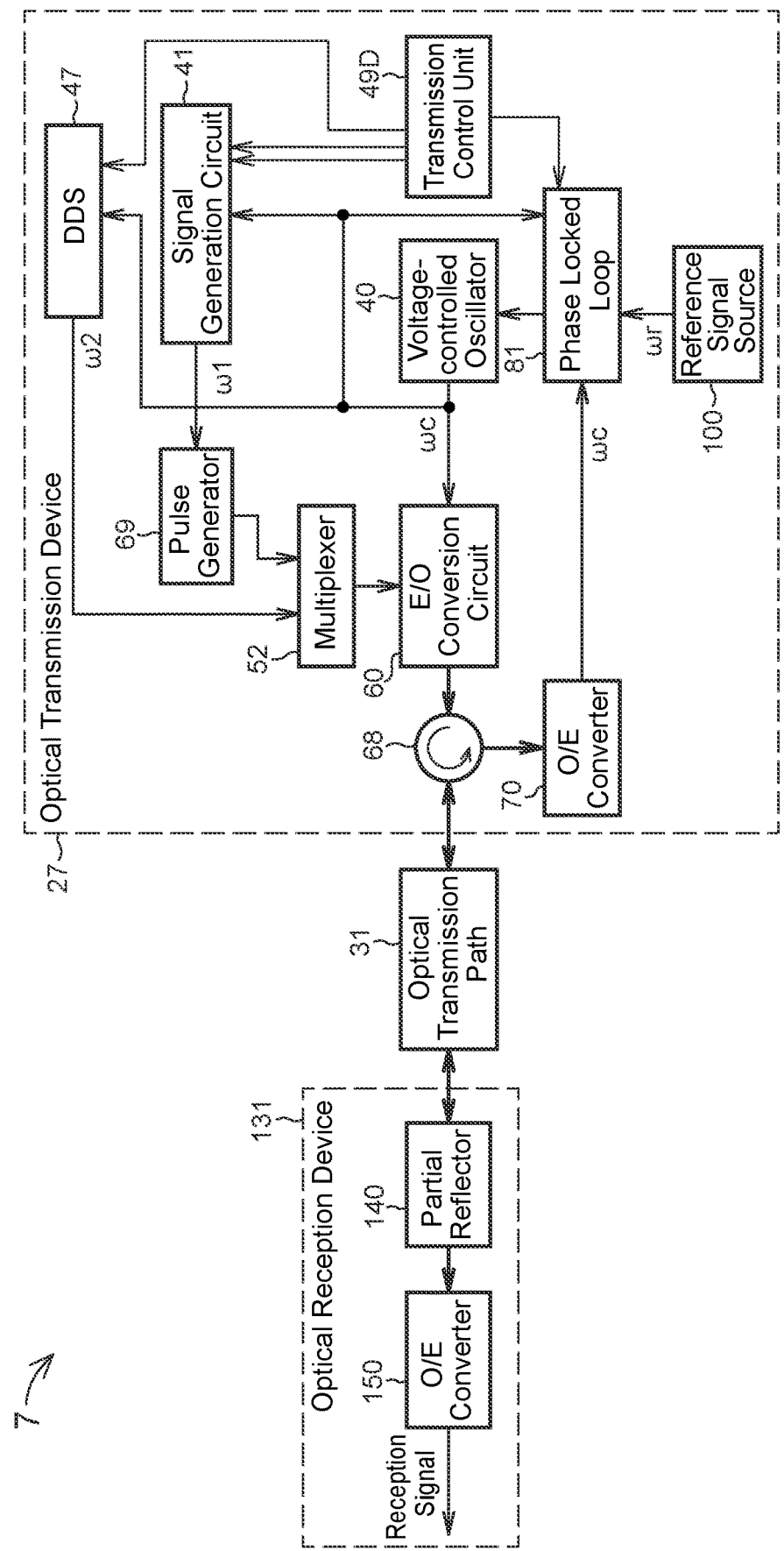
FIG. 13 is a block diagram illustrating a schematic configuration of an optical transmission system according to a seventh embodiment of the present invention.

Next, a seventh embodiment according to the present invention will be described. FIG. 13 is a block diagram illustrating a schematic configuration of an optical transmission system 7 according to the seventh embodiment of the present invention. As illustrated in FIG. 13, the optical transmission system 7 of the present embodiment includes an optical transmission device 27, an optical transmission path 31, and an optical reception device 131. The optical transmission device 27 of the seventh embodiment includes a DDS 47 (FIG. 13) instead of the signal generation circuit 43 as compared with the optical transmission device 26 of the sixth embodiment.

In the configuration of the present embodiment, in the instantaneous frequency of a signal generated by a signal generation circuit 41, the phase fluctuation component of the optical transmission path 31 is removed by an optical-to-electrical converter 150 like in the first embodiment, which is expressed by the following Expression (34).

$$\frac{Na \times Nc}{2Nb}\left(\omega r + \frac{\Delta\phi_{r0}}{\Delta t}\right) \quad (34)$$

Also, the instantaneous frequency of an output signal of the DDS 47 is expressed by the following Equation (35) similarly to Expression (19).

$$D \times \omega c + D\frac{\Delta\phi_{r0}}{\Delta t} = \frac{Na \times D}{2}\omega r + D\left(\frac{Na}{2}\frac{\Delta\phi_{r0}}{\Delta t} - \frac{\Delta\phi_{\omega cF}}{\Delta t}\right) \quad (35)$$

In the optical-to-electrical converter 150 of the optical reception device 131, an instantaneous frequency component expressed by the following Expression (36), from which the phase fluctuation component of the optical transmission path 31 is removed, is obtained.

$$\frac{Na \times D}{2}\left(\omega r + \frac{\Delta\phi_{r0}}{\Delta t}\right) \quad (36)$$

In a case where a photodiode is used as the optical-to-electrical converter 150, square law detection is performed on such a transmission signal. Therefore, when an intensity-modulated optical signal is detected, the sum frequency component of Expressions (31) and (32) expressed by the following Equation (37) is also output.

$$\frac{Na \times Nc}{2Nb}\left(\omega r + \frac{\Delta\phi_{r0}}{\Delta t}\right) + \frac{Na \times D}{2}\left(\omega r + \frac{\Delta\phi_{r0}}{\Delta t}\right) = \quad (37)$$
$$\frac{Na}{2}\left(\frac{Nc}{Nb} + D\right)\left(\omega r + \frac{\Delta\phi_{r0}}{\Delta t}\right)$$

Therefore, it is possible to cause the optical-to-electrical converter 150 of the transmission destination (optical reception device 131) to operation with an added function of frequency conversion.

In the seventh embodiment, the response frequency required for an electrical-to-optical conversion circuit 60 of the transmission source (optical transmission device 27) may be any frequency as long as the response has the output frequency of the signal generation circuits 41 and the output frequency of the DDS 47, and no frequency-converted response frequency is required. Therefore, the response frequency characteristics required for the electrical-to-optical conversion circuit 60 are relaxed, which contributes to cost reduction. Moreover, the DDS 47 makes it possible to control the phase and the amplitude separately and to transmit a modulation signal such as a chirp signal.

Eighth Embodiment

Figure 14:
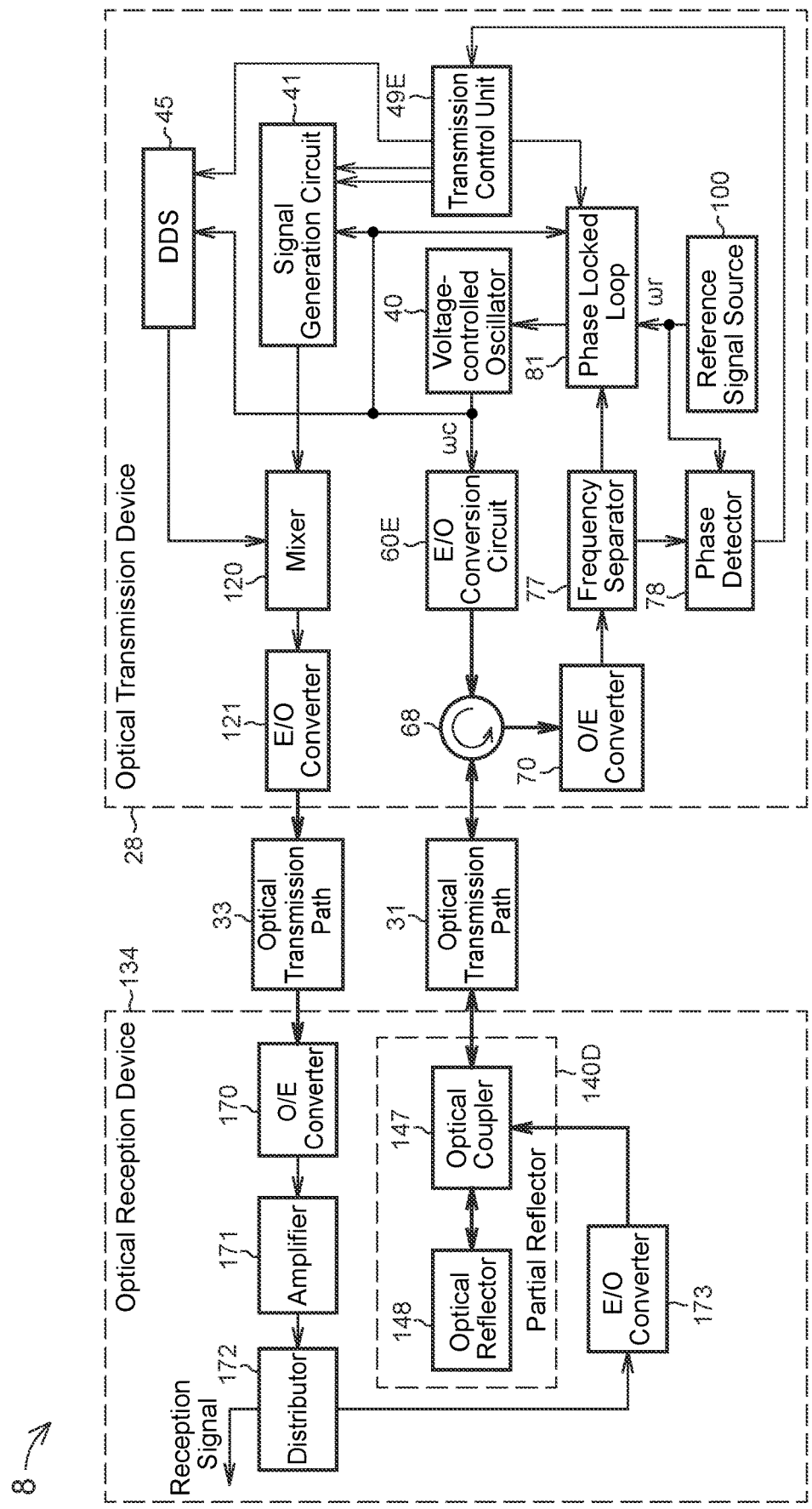
FIG. 14 is a block diagram illustrating a schematic configuration of an optical transmission system according to an eighth embodiment of the present invention.

Next, an eighth embodiment according to the present invention will be described. FIG. 14 is a block diagram illustrating a schematic configuration of an optical transmission system 8 according to the eighth embodiment of the present invention. As illustrated in FIG. 14, the optical transmission system 8 includes an optical transmission device 28, two systems of optical transmission paths (first and second optical transmission paths) 31 and 33, and an optical reception device 134.

The optical transmission device 28 of the eighth embodiment includes a voltage-controlled oscillator 40, a phase locked loop 81 for executing frequency conversion (self-frequency offset) using a signal of the voltage-controlled oscillator 40 and feeding back to perform phase synchronization, an electrical-to-optical converter 60E for converting the output signal of the voltage-controlled oscillator 40 into an optical signal, and an optical circulator 68 for separating the route in the propagation path of the output optical signal of the electrical-to-optical converter 60E. The optical transmission path 31 is an optical transmission path for transmitting the optical signal output from the electrical-to-optical converter 60E via the optical circulator 68, such as an optical fiber. On the other hand, the optical reception device 134 of the present embodiment includes an optical coupler 147 which is an optical branching and multiplexing unit for branching the light transmitted from the optical transmission path 31, and an optical reflector 148 for reflecting the light branched by the optical coupler 147. The optical coupler 147 couples the optical signal, which is reflected by the optical reflector 148, into the optical transmission path 31. A partial reflector 140D includes the optical coupler 147 and the optical reflector 148. The optical transmission device 28 further includes: a optical-to-electrical converter 70 for converting the optical signal separated by the optical circulator 68 after being reflected by the partial reflector 140D into an electric signal and outputting a feedback signal to the phase locked loop 81; a reference signal source 100 for supplying a reference signal to the phase locked loop 81; a signal generation circuit 41 that operates using the output signal of the voltage-controlled oscillator 40 as a reference signal; a direct digital synthesizer (DDS) 45 that operates using the output signal of the voltage-controlled oscillator 40 as an operating clock; a transmission control unit 49E for setting a parameter of the DDS 45, a mixer (frequency mixer) 120 for frequency-mixing an output signal of the signal generation circuit 41 and an output signal of the DDS 45; and an electrical-to-optical converter 121 for converting an output signal of the frequency mixer 120 into an optical signal. The optical transmission path 33 is an optical transmission path for transmitting an optical signal output from the electrical-to-optical converter 121. Meanwhile, the optical reception device 134 includes: a optical-to-electrical converter 170 for converting the optical signal transmitted by the optical transmission path 33 into an electrical signal; an amplifier 171 for amplifying the output signal of the optical-to-electrical converter 170; a distributor 172 for distributing the output signal from the amplifier 171; an electrical-to-optical converter 173 for converting the signal distributed by the distributor 172 into an optical signal, inputting the optical signal to the optical branching and multiplexing unit 147, and transmitting the optical signal to the optical transmission path 31; a frequency separator 77 for separating, from the output signal of the optical-to-electrical converter 70, a calibration signal frequency that is fed back to the phase locked loop 81 and a frequency mixing component of the output signal of the signal generation circuit 41 and the output signal of the DDS 45; and a phase detector 78 for detecting the phase of the frequency component output from the frequency mixer 120, which is output from the frequency separator 77, on the basis of the reference signal supplied from the reference signal source 100, and supplying phase information for determining a DDS setting phase by the transmission control unit 49E on the basis of the detected phase information.

The phase synchronization and oscillation methods of the voltage-controlled oscillator 40 are the same as in the first embodiment. Moreover, the oscillation and the signal generation in the signal generation circuit 41, which is a programmable PLL circuit, and the DDS 45 are similar to those in the fourth embodiment, and the signal output by the frequency mixer 120 is defined by the instantaneous frequency of the following Expression (38), as an up conversion component, like by Expression (20).

$$\left(\omega 2 + \frac{\Delta\phi_{20}}{\Delta t}\right) + \left(\omega 1 + \frac{\Delta\phi_{10}}{\Delta t}\right) \quad (38)$$

The output signal of the frequency mixer 120 is converted into an optical signal by the electrical-to-optical converter 121, transmitted through the optical transmission path 33, and the instantaneous frequency of the electric signal output from the optical-to-electrical converter 170 is output at the instantaneous frequency of the following Expression (39) after being subjected to the phase fluctuation of a phase fluctuation component of $\Delta\rho_{(\omega 1+\omega 2)F}$ with respect to a frequency of $\omega 1+\omega 2$ of the optical transmission path 33.

$$\left(\omega 2 + \frac{\Delta\phi_{20}}{\Delta t}\right) + \left(\omega 1 + \frac{\Delta\phi_{10}}{\Delta t}\right) + \frac{\Delta\rho_{(\omega 1+\omega 2)F}}{\Delta t} \quad (39)$$

Next, let us assume that the amount of phase fluctuation of the amplifier 171 is $\Delta\theta$, the instantaneous frequency of a signal output from the distributor 172 is given by the following Expression (40).

$$\left(\omega 2 + \frac{\Delta\phi_{20}}{\Delta t}\right) + \left(\omega 1 + \frac{\Delta\phi_{10}}{\Delta t}\right) + \frac{\Delta\rho_{(\omega 1+\omega 2)F}}{\Delta t} + \frac{\Delta\theta}{\Delta t} \quad (40)$$

A signal having this instantaneous frequency is converted into an optical signal by the electrical-to-optical converter 173, and undergoes a phase fluctuation of a phase fluctuation component $\Delta\varphi_{(\omega 1+\omega 2)}F$ with respect to the frequency $\omega 1+\omega 2$ of the optical transmission path 31. At this point, the instantaneous frequency of the electric signal output from the optical-to-electrical converter 70 is given by the following Expression (41).

$$\left(\omega 2 + \frac{\Delta\phi_{20}}{\Delta t}\right) + \left(\omega 1 + \frac{\Delta\phi_{10}}{\Delta t}\right) + \frac{\Delta\rho_{(\omega 1+\omega 2)F}}{\Delta t} + \frac{\Delta\theta}{\Delta t} + \frac{\Delta\phi_{(\omega 1+\omega 2)F}}{\Delta t} \quad (41)$$

Here, similarly to the case illustrated in the fourth embodiment, the following Equation (42) is established.

$$\left(\omega 2 + \frac{\Delta\phi_{20}}{\Delta t}\right) + \left(\omega 1 + \frac{\Delta\phi_{10}}{\Delta t}\right) + \frac{\Delta\phi_{(\omega 1+\omega 2)F}}{\Delta t} = \quad (42)$$

-continued
$$\frac{Na}{2}\left(D + \frac{Nc}{Nb}\right)\left(\omega r + \frac{\Delta\phi_{r0}}{\Delta t}\right)$$

Therefore, Expression (41) can be deformed into the following Expression (43).

$$\frac{Na}{2}\left(D + \frac{Nc}{Nb}\right)\left(\omega r + \frac{\Delta\phi_{r0}}{\Delta t}\right) + \frac{\Delta\rho_{(\omega 1+\omega 2)F}}{\Delta t} + \frac{\Delta\theta}{\Delta t} \quad (43)$$

Next, since the phase detector 78 can perform phase detection depending on the instantaneous frequency $\omega r+\Delta\varphi_{r0}/\Delta t$ of the reference signal, the phase fluctuation component $\Delta\rho_{(\omega 1+\omega 2)F}+\Delta\theta$ of the optical transmission path 33 and the amplifier 171 can be detected. By repeating offset correction of the initial phase of the DDS 45 by $\Delta\rho_{(\omega 1+\omega 2)F}+\Delta\theta$ by the transmission control unit 49E on the basis of the detected phase, it is possible to make output from the distributor 172 to be a phase-stable signal depending on the reference signal as illustrated in the following Expression (44).

$$\frac{Na}{2}\left(D + \frac{Nc}{Nb}\right)\left(\omega r + \frac{\Delta\phi_{r0}}{\Delta t}\right) \quad (44)$$

As described above, in the eighth embodiment, it is possible to monitor and to correct the phase fluctuation of the path outside the phase locked loop that controls the voltage-controlled oscillator 40, and it is also possible to correct the phase fluctuation amount of an element that has a large phase fluctuation depending on the environment or the frequency, such as the amplifier 171. Furthermore, since the phase fluctuation amount component of the amplifier 171 can also be corrected, a high-output and phase-stable signal can be transmitted.

Ninth Embodiment

Figure 15:
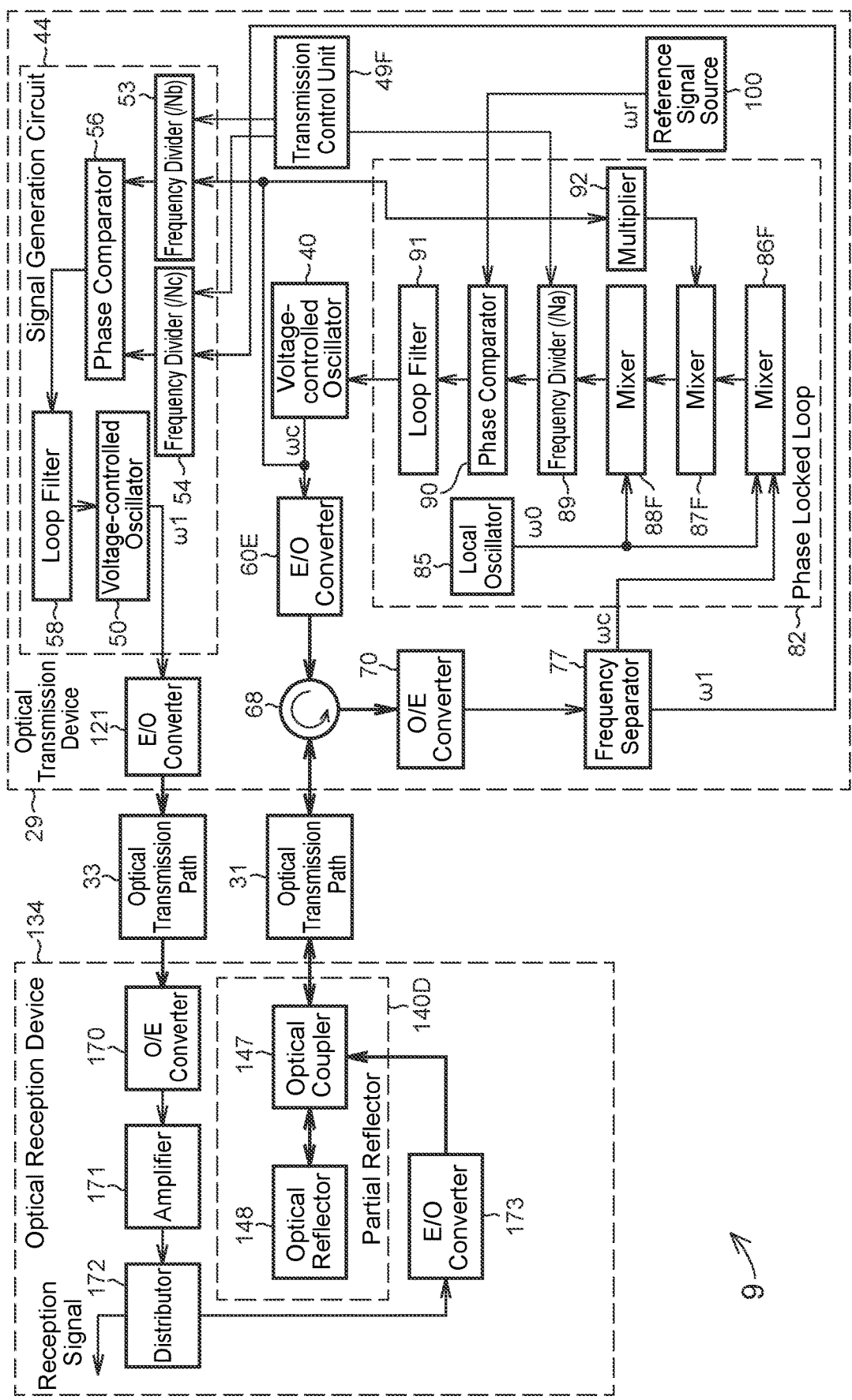
FIG. 15 is a block diagram illustrating a schematic configuration of an optical transmission system according to a ninth embodiment of the present invention.

Next, a ninth embodiment according to the present invention will be described. FIG. 15 is a block diagram illustrating a schematic configuration of an optical transmission system 9 according to the ninth embodiment of the present invention. As illustrated in FIG. 15, the optical transmission system 9 of the present embodiment includes an optical transmission device 29, two systems of optical transmission paths (first and second optical transmission paths) 31 and 33, and an optical reception device 134.

The optical transmission device 29 of the ninth embodiment includes a voltage-controlled oscillator 40, a phase locked loop 82 for executing frequency conversion (self-frequency offset) using a signal of the voltage-controlled oscillator 40 and feeding back to perform phase synchronization, an electrical-to-optical converter 60E for converting the output signal of the voltage-controlled oscillator 40 into an optical signal, and an optical circulator 68 for separating the route in the path of the output optical signal of the electrical-to-optical converter 60E. The optical transmission path 31 is an optical transmission path for transmitting the optical signal output from the electrical-to-optical converter 60E via the optical circulator 68, such as an optical fiber. On the other hand, the optical reception device 134 of the present embodiment includes an optical coupler 147 which is an optical branching and multiplexing unit for branching the light transmitted from the optical transmission path 31, and an optical reflector 148 for reflecting the light branched by the optical coupler 147. The optical coupler 147 couples the optical signal, which is reflected by the optical reflector 148, into the optical transmission path 31. A partial reflector 140D includes the optical coupler 147 and the optical reflector 148. The optical transmission device 29 further includes: a optical-to-electrical converter 70 for converting the optical signal route-separated by the optical circulator 68 after being reflected by the partial reflector 140D into an electric signal and outputting a feedback signal to the phase locked loop 82; a reference signal source 100 for supplying a reference signal to the phase locked loop 82; a signal generation circuit 44 that operates using the output signal of the voltage-controlled oscillator 40 as a reference signal; and an electrical-to-optical converter 121 for converting an output signal of the signal generation circuit 44 into an optical signal. The optical transmission path 33 is an optical transmission path, such as an optical fiber, for transmitting an optical signal output from the electrical-to-optical converter 121. The optical reception device 134 further includes: a optical-to-electrical converter 170 for converting the optical signal transmitted by the optical transmission path 33 into an electric signal; an amplifier 171 for amplifying the output signal of the optical-to-electrical converter 170; a distributor 172 for distributing the output signal from the amplifier 171; and an electrical-to-optical converter 173 for converting the signal distributed by the distributor 172 into an optical signal, inputting the optical signal to the optical branching and multiplexing unit 147, and transmitting the optical signal through the optical transmission path 31. Meanwhile, the optical transmission device 29 further includes: a frequency separator 77 for separating, from the output signal of the optical-to-electrical converter 70, the component of the calibration signal frequency we to be fed back to the phase locked loop 82 and the component of the frequency ω1 to be supplied to the signal generation circuit 44; and a transmission control unit 49F.

Here, in FIG. 15, the phase locked loop 82 includes, for example, a local oscillator 85, mixers 86F and 88F for performing frequency conversion by an output signal of the local oscillator 85, a multiplier 92 for multiplying (×3) the output signal of the voltage-controlled oscillator 40, a mixer 87F for performing frequency conversion (self-frequency offset) using the signal obtained by multiplying the output signal of the voltage-controlled oscillator 40, a frequency divider 89 for dividing the signal frequency-converted by the mixer 88F by a frequency division number Na, a phase comparator 90 for comparing the output signal of the frequency divider 89 and the reference signal generated by the reference signal source 100, and a loop filter 91 for using an error signal detected by the phase comparator 90 as a control signal of the voltage-controlled oscillator 40.

For example as illustrated in FIG. 15, as in the first embodiment of FIG. 1, the signal generation circuit 44 includes a frequency divider 53 for dividing the reference signal, a frequency divider 54 for dividing a feedback signal, a phase comparator 56 for outputting an error signal by comparing the phase and the frequency between the signals output from the frequency dividers 53 and 54, a loop filter 58 for integrating the error signal from the phase comparator 56 to obtain a control signal, and a voltage-controlled oscillator (VCO) 50 that is controlled by the control signal output from the loop filter 58. The frequency divider 54 receives a signal component separated by the frequency separator 77 and transmitted through the optical transmission path 31 and a path including the optical transmission path 31.

The output signal (frequency ωc) of the voltage-controlled oscillator 40 is converted into an optical signal by the electrical-to-optical converter 60E, transmitted to the partial reflector 140D via the optical circulator 68 and the optical transmission path 31, and again converted into an electric signal by the optical-to-electrical converter 70 via the optical transmission path 31 and the optical circulator 68. Here, the instantaneous phase fluctuation due to the actual length fluctuation of the optical transmission path 31 is defined as $\Delta\varphi_{*F}$. Value $\Delta\varphi_{*F}$ varies depending on a frequency superimposed on the optical signal. At this point, the instantaneous frequency of the electric signal converted by the optical-to-electrical converter 70 is affected by a phase fluctuation component $\Delta\varphi_{\omega cF}$ with respect to the frequency ωc of the optical transmission path 31, for a round-trip thereof, and is given by the following Expression (45).

$$\omega c + \frac{\Delta\phi_{c0}}{\Delta t} + 2\frac{\Delta\phi_{\omega cF}}{\Delta t} \tag{45}$$

Here, the coefficient "2" for $\Delta\varphi_{\omega cF}$ expresses a round-trip.

Next, in a case where the configuration of the phase locked loop 82 is as illustrated in FIG. 15, the instantaneous frequency of a down conversion component obtained by the mixer 86F on the basis of the signal output from the optical-to-electrical converter 70 is given by the following Expression (46) (assuming ωc>ω0).

$$\omega c - \omega 0 + \frac{\Delta\phi_{c0}}{\Delta t} + 2\frac{\Delta\phi_{\omega cF}}{\Delta t} - \frac{\Delta\phi_{00}}{\Delta t} \tag{46}$$

Then, the mixer 87F frequency-mixes a signal obtained by multiplying the output signal of the voltage-controlled oscillator 40 by 3 and the output signal of the mixer 86F to obtain a differential frequency component that has been frequency-shifted (self-frequency offset) as illustrated in the following Equation (47).

$$\left| \omega c - \omega 0 + \frac{\Delta\phi_{c0}}{\Delta t} + 2\frac{\Delta\phi_{\omega cF}}{\Delta t} - \frac{\Delta\phi_{00}}{\Delta t} - 3\left(\omega c + \frac{\Delta\phi_{c0}}{\Delta t}\right) \right| = \tag{47}$$
$$2\omega c + 2\frac{\Delta\phi_{c0}}{\Delta t} - 2\frac{\Delta\phi_{\omega cF}}{\Delta t} + \omega 0 + \frac{\Delta\phi_{00}}{\Delta t}$$

Furthermore, the mixer 88F mixes the output signal of the mixer 87F and the output signal of the local oscillator 85 to obtain a down conversion component having the instantaneous frequency of the following Expression (48).

$$2\omega c + 2\left(\frac{\Delta\phi_{c0}}{\Delta t} - \frac{\Delta\phi_{\omega cF}}{\Delta t}\right) \tag{48}$$

When the output signal of the mixer 88F is divided by Na by the frequency divider 89, the instantaneous frequency component is given by the following Expression (49).

$$\frac{2}{Na}\left(\omega c + \frac{\Delta\phi_{c0}}{\Delta t} - \frac{\Delta\phi_{\omega cF}}{\Delta t}\right) \tag{49}$$

The output signal of the frequency divider 89 and the output signal of the reference signal source 100 are compared by the phase comparator 90 in terms of the phase and the frequency, and as a result, an error signal is output. The loop filter 91 can establish phase synchronization by integrating the error signal and generating a control signal of the voltage-controlled oscillator 40. At this point, the phases and frequencies of Expressions (49) and (9) are compared, and phase synchronization is performed so that the following Equations (50) are satisfied.

$$\frac{2}{Na}\left(\omega c + \frac{\Delta\phi_{c0}}{\Delta t} - \frac{\Delta\phi_{\omega cF}}{\Delta t}\right) = \omega r + \frac{\Delta\phi_{r0}}{\Delta t} \quad (50)$$

$$\omega c = \frac{Na}{2}\omega r, \quad \frac{\Delta\phi_{c0}}{\Delta t} = \frac{Na}{2}\frac{\Delta\phi_{r0}}{\Delta t} + \frac{\Delta\phi_{\omega cF}}{\Delta t}$$

Here, the phase fluctuation components of the optical transmission path 31 are mainly caused by the actual length fluctuation $\Delta L$ attributable to, for example, temperature fluctuation, vibration, or tension of the optical fiber, and thus the following Equations (51) hold between phase fluctuation components with respect to the frequencies $\omega c$ and $\omega r$.

$$\Delta\phi_{\omega cF} = \omega c \frac{n\Delta L}{c}, \quad (51)$$

$$\Delta\phi_{\omega rF} = \omega r \frac{n\Delta L}{c} = \frac{\omega r}{\omega c}\Delta\phi_{\omega cF} \frac{2}{Na}\Delta\phi_{\omega cF}$$

Therefore, Equations (50) can be deformed into the following Equations (52).

$$\frac{2}{Na}\left(\omega c + \frac{\Delta\phi_{c0}}{\Delta t} - \frac{\Delta\phi_{\omega cF}}{\Delta t}\right) = \omega r + \frac{\Delta\phi_{r0}}{\Delta t} \quad (52)$$

$$\omega c = \frac{Na}{2}\omega r, \quad \frac{\Delta\phi_{c0}}{\Delta t} = \frac{Na}{2}\left(\frac{\Delta\phi_{r0}}{\Delta t} + \frac{\Delta\phi_{\omega rF}}{\Delta t}\right)$$

Next, the instantaneous frequency of an output signal of the VCO 50, which is the oscillation source of the signal generation circuit 44, is defined by the following Expression (53) like in the first embodiment.

$$\omega 1 + \frac{\Delta\phi_{10}}{\Delta t} \quad (53)$$

An output signal of the VCO 50 is converted into an optical signal by the electrical-to-optical converter 121, transmitted by the optical transmission path 33 while being affected by a phase fluctuation component $\Delta\rho_{\omega 1F}$ with respect to the frequency $\omega 1$, and converted into an electric signal by the optical-to-electrical converter 170. The signal output from the optical-to-electrical converter 170 is affected by a phase fluctuation component $\Delta\theta$ by the amplifier 171, and becomes a signal expressed by the instantaneous frequency of the following Expression (54).

$$\omega 1 + \frac{\Delta\phi_{10}}{\Delta t} + \frac{\Delta\rho_{\omega 1F}}{\Delta t} + \frac{\Delta\theta}{\Delta t} \quad (54)$$

This signal is distributed by the distributor 172, converted into an optical signal by the electrical-to-optical converter 173, input to the optical coupler (optical branching and multiplexing unit) 147, transmitted through the optical transmission path 31 while being affected by a phase fluctuation component $\Delta\phi_{\omega 1F}$ with respect to $\omega 1$, subjected to route separation by the optical circulator 68, converted into an electric signal by the optical-to-electrical converter 70, separated by the frequency separator 77, and fed back to the signal generation circuit 44. The instantaneous frequency of the feedback signal at this time is given by the following Expression (55).

$$\omega 1 + \frac{\Delta\phi_{10}}{\Delta t} + \frac{\Delta\rho_{\omega 1F}}{\Delta t} + \frac{\Delta\theta}{\Delta t} + \frac{\Delta\phi_{\omega 1F}}{\Delta t} \quad (55)$$

Next, in the signal generation circuit 44, when the phase and the frequency are compared between a signal obtained by dividing the output signal of the voltage-controlled oscillator 40 by Nb that is obtained by the frequency divider 53 and a signal obtained by dividing by Nc that is obtained by the frequency divider 54 and expressed by Expression (55) and the phase synchronization is established, the following Equation (56) is established.

$$\frac{1}{Nb}\left(\omega c + \frac{\Delta\phi_{c0}}{\Delta t}\right) = \frac{1}{Nc}\left(\omega 1 + \frac{\Delta\phi_{10}}{\Delta t} + \frac{\Delta\rho_{\omega 1F}}{\Delta t} + \frac{\Delta\theta}{\Delta t} + \frac{\Delta\phi_{\omega 1F}}{\Delta t}\right) \quad (56)$$

Here, with Equations (52), Equation (56) can be deformed into the following Equations (57).

$$\frac{Na}{2Nb}\left(\omega r + \frac{\Delta\phi_{r0}}{\Delta t} + \frac{\Delta\phi_{\omega rF}}{\Delta t}\right) = \quad (57)$$

$$\frac{1}{Nc}\left(\omega 1 + \frac{\Delta\phi_{10}}{\Delta t} + \frac{\Delta\rho_{\omega 1F}}{\Delta t} + \frac{\Delta\theta}{\Delta t} + \frac{\Delta\phi_{\omega 1F}}{\Delta t}\right)$$

$$\frac{Na}{2Nb}\omega r = \frac{1}{Nc}\omega 1$$

Furthermore, the following Equation (58) holds similarly to the case of equations (51).

$$\Delta\phi_{\omega 1F} = \omega 1 \frac{n\Delta L}{c} = \frac{\omega 1}{\omega r}\Delta\phi_{\omega rF} = \frac{Na \times Nc}{2Nb}\Delta\phi_{\omega rF} \quad (58)$$

Therefore, Equation (57) can be deformed as the following Equation (59).

$$\frac{Na}{2Nb}\left(\omega r + \frac{\Delta\phi_{r0}}{\Delta t} + \frac{\Delta\phi_{\omega rF}}{\Delta t}\right) = \quad (59)$$

$$\frac{1}{Nc}\left(\omega 1 + \frac{\Delta\phi_{10}}{\Delta t} + \frac{\Delta\rho_{\omega 1F}}{\Delta t} + \frac{\Delta\theta}{\Delta t} + \frac{Na \times Nc}{2Nb}\frac{\Delta\phi_{\omega rF}}{\Delta t}\right)$$

$$=> \omega 1 + \frac{\Delta\phi_{10}}{\Delta t} + \frac{\Delta\rho_{\omega 1F}}{\Delta t} + \frac{\Delta\theta}{\Delta t} = \frac{Na \times Nc}{2Nb}\left(\omega r + \frac{\Delta\phi_{r0}}{\Delta t}\right)$$

Since deformation can be performed as in Equation (59), the signal output from the amplifier 171 and output from the distributor 172 and expressed by Expression (54) is removed of the phase fluctuation component of the optical transmission paths such as optical fibers, and becomes a phase-stable signal on the basis of the reference signal generated by the reference signal source 100.

As described above, in the ninth embodiment, it is possible to transmit the frequency-variable oscillation signal of the signal generation circuit 44, which is a programmable PLL circuit, while the phase fluctuation amount of an element which has a large phase fluctuation depending on the environment or the frequency, such as the optical transmission path and the amplifier in the transmission path, is corrected in real time at high speed by analog phase synchronization. Furthermore, since the phase fluctuation amount component of the amplifier 171 can also be corrected, a high-output and phase-stable signal can be transmitted.

Tenth Embodiment

Figure 16:
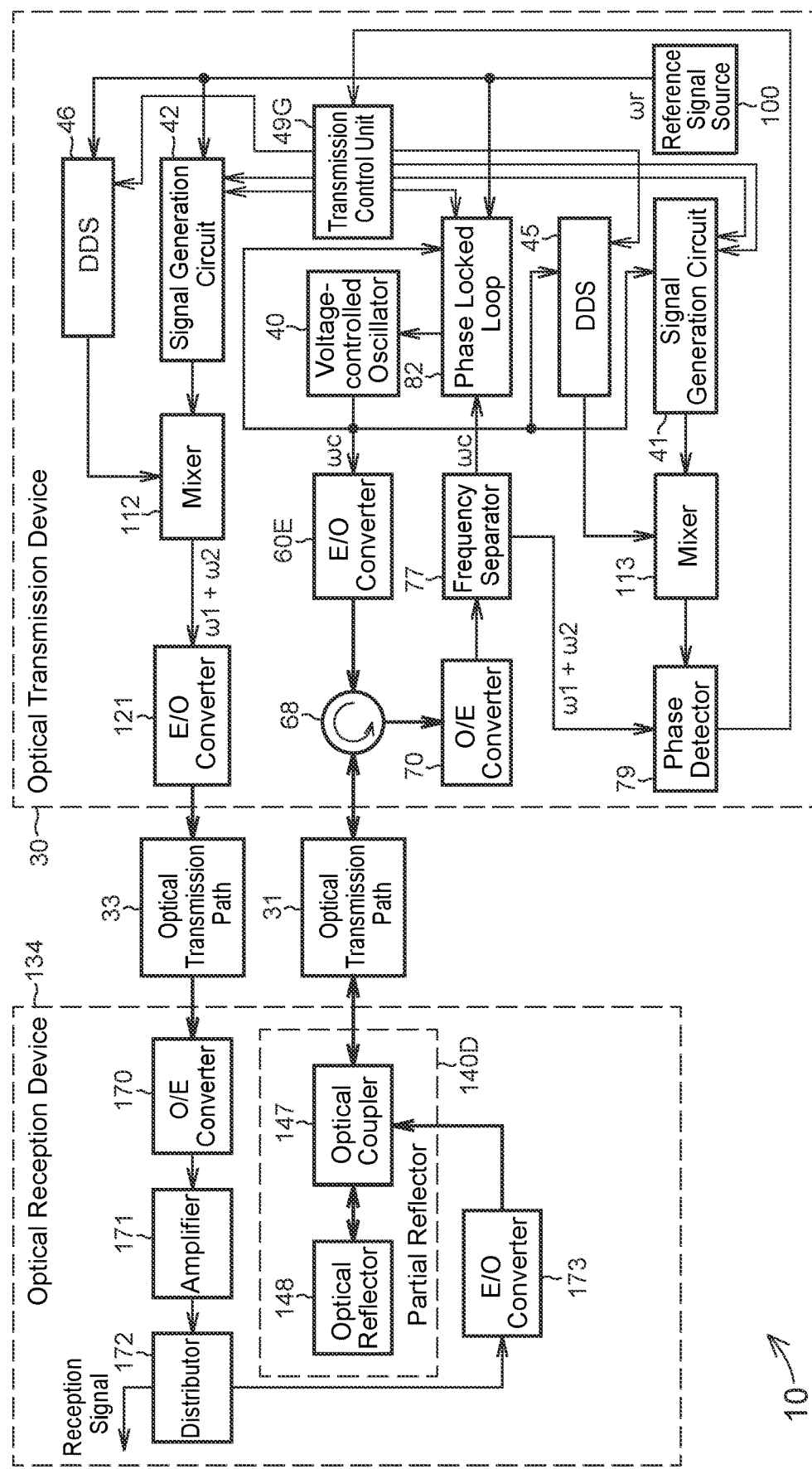
FIG. 16 is a block diagram illustrating a schematic configuration of an optical transmission system according to a tenth embodiment of the present invention.

Next, a tenth embodiment according to the present invention will be described. FIG. 16 is a block diagram illustrating a schematic configuration of an optical transmission system 10 according to the tenth embodiment of the present invention. As illustrated in FIG. 16, the optical transmission system 10 of the present embodiment includes an optical transmission device 30, two systems of optical transmission paths (first and second optical transmission paths) 31 and 33, and an optical reception device 134.

The optical transmission device 30 of the tenth embodiment includes a voltage-controlled oscillator 40, a phase locked loop 82 for executing frequency conversion (self-frequency offset) using a signal of the voltage-controlled oscillator 40 and feeding back to perform phase synchronization, an electrical-to-optical converter 60E for converting the output signal of the voltage-controlled oscillator 40 into an optical signal, and an optical circulator 68 for separating the route in a path of the output optical signal of the electrical-to-optical converter 60E. The optical transmission path 31 is an optical transmission path for transmitting the optical signal output from the electrical-to-optical converter 60E via the optical circulator 68, such as an optical fiber. On the other hand, the optical reception device 134 of the present embodiment includes an optical coupler 147 which is an optical branching and multiplexing unit for branching the light transmitted from the optical transmission path 31, and an optical reflector 148 for reflecting the light branched by the optical coupler 147. The optical coupler 147 couples the optical signal, which is reflected by the optical reflector 148, into the optical transmission path 31. A partial reflector 140D includes the optical coupler 147 and the optical reflector 148. The optical transmission device 30 further includes: a optical-to-electrical converter 70 for converting the optical signal route-separated by the optical circulator 68 after being reflected by the partial reflector 140D into an electric signal and outputting a feedback signal to the phase locked loop 82; a reference signal source 100 for supplying a reference signal to the phase locked loop 82; a signal generation circuit 41 that operates using the output signal of the voltage-controlled oscillator 40 as a reference signal; a DDS 45 that operates using the output signal of the voltage-controlled oscillator 40 as a clock signal (operating clock); a mixer (frequency mixer) 113 for frequency-mixing an output signal of the signal generation circuit 41 and an output signal of the DDS 45; a signal generation circuit 42 functioning as a programmable PLL circuit that operates using the signal supplied from the reference signal source 100 as a reference signal; a DDS 46 that operates using the signal supplied from the reference signal source 100 as a clock signal (operating clock); a mixer (frequency mixer) 112 for frequency-mixing the output signal of the signal generation circuit 42 and the output signal of the DDS 46; and an electrical-to-optical converter 121 for converting the signal output from the mixer 112 into an optical signal. The optical transmission path 33 is an optical transmission path for transmitting an optical signal output from the electrical-to-optical converter 121. The optical reception device 134 further includes: an optical-to-electrical converter 170 for converting the optical signal transmitted by the optical transmission path 33 into an electric signal; an amplifier 171 for amplifying the output signal of the optical-to-electrical converter 170; a distributor 172 for distributing the output signal from the amplifier 171; and an electrical-to-optical converter 173 for converting the signal distributed by the distributor 172 into an optical signal, inputting the optical signal to the optical branching and multiplexing unit 147, and transmitting the optical signal through the optical transmission path 31 such as an optical fiber. The optical transmission device 30 further includes: a frequency separator 77 for separating, from the output signal of the optical-to-electrical converter 70, a component of the calibration signal frequency to be fed back to the phase locked loop 82 and a component of the mixed frequency ω1+ω2 to be supplied to the phase detector 79; a phase detector 79 for detecting the phase difference between the signal output from the frequency separator 77 and the signal output from the mixer 113; and a transmission control unit 49G for setting parameters of the DDSs 45 and 46 on the basis of the phase difference detected by the phase detector 79.

The oscillation method and the synchronization method of the voltage-controlled oscillator 40 are similar to the ninth embodiment. At this point, the up conversion component obtained by the mixer 113 on the basis of the signal output from the signal generation circuit 41 and the signal output from the DDS 45 is given by the following Expression (60).

$$\left(\omega 2 + \frac{\Delta\phi_{20}}{\Delta t}\right) + \left(\omega 1 + \frac{\Delta\phi_{10}}{\Delta t}\right) \quad (60)$$

Here, ω1 and $\Delta\varphi_{10}$ are the oscillation frequency and the phase noise component of the signal generation circuit 41, respectively, and ω2 and $\Delta\varphi_{20}$ are the generation signal frequency and the phase noise component of the DDS 45, respectively. When the configuration of the signal generation circuit 41 is similar to that of the first embodiment, similarly to Equations (14), relational Equations (61) hold among the instantaneous frequency of the signal generation circuit 41, the instantaneous frequency of the voltage-controlled oscillator 40, and the instantaneous frequency of the reference signal source 100.

$$\frac{1}{Nb}\left(\omega c + \frac{\Delta\phi_{c0}}{\Delta t}\right) = \frac{1}{Nc}\left(\omega 1 + \frac{\Delta\phi_{10}}{\Delta t}\right) \quad (61)$$

$$\omega 1 = \frac{Nc}{Nb}\omega c = \frac{Na \times Nc}{2Nb}\omega r,$$

$$\frac{\Delta\phi_{10}}{\Delta t} = \frac{Nc}{Nb}\frac{\Delta\phi_{c0}}{\Delta t} = \frac{Nc}{Nb}\left(\frac{Na}{2}\frac{\Delta\phi_{r0}}{\Delta t} + \frac{\Delta\phi_{\omega cF}}{\Delta t}\right)$$

Note that in Equations (61), the sign of $\Delta\varphi_{\omega cF}$ is inverted, considering that the phase locked loop 82 is similar to that of the ninth embodiment. Furthermore, similarly to the fourth embodiment, the following relationship is established between the instantaneous frequency of a signal generated by the DDS and the instantaneous frequency of the voltage-controlled oscillator 40. If the ratio of the center frequency of the output signal and the center frequency of the clock signal of the DDS is defined as $\omega 2/\omega c = D$, the following Equation (62) holds.

$$\omega 2 + \frac{\Delta \phi_{20}}{\Delta t} = D \times \omega c + D \frac{\Delta \phi_{c0}}{\Delta t} = \frac{Na \times D}{2} \omega r + D\left(\frac{Na}{2}\frac{\Delta \phi_{r0}}{\Delta t} + \frac{\Delta \phi_{\omega cF}}{\Delta t}\right) \quad (62)$$

Therefore, Expression (60) can be deformed into the following Equation (63).

$$\frac{Na \times D}{2}\omega r + D\left(\frac{Na}{2}\frac{\Delta \phi_{r0}}{\Delta t} + \frac{\Delta \phi_{\omega cF}}{\Delta t}\right) + \frac{Na \times Nc}{2Nb}\left(\omega r + \frac{\Delta \phi_{r0}}{\Delta t}\right) + \quad (63)$$
$$\frac{Nc}{Nb}\frac{\Delta \phi_{\omega cF}}{\Delta t} = \frac{Na}{2}\left(D + \frac{Nc}{Nb}\right)\left(\omega r + \frac{\Delta \phi_{r0}}{\Delta t}\right) + \left(D + \frac{Nc}{Nb}\right)\frac{\Delta \phi_{\omega cF}}{\Delta t}$$

Next, in a case where the center frequencies of the output signals of the signal generation circuit 42 and the DDS 46 that operate depending on the reference signal supplied from the reference signal source 100 are matched with those of the signal generation circuit 41 and the DDS 45, the instantaneous frequency of the output signal up-converted by the mixer 112 is given by the following Equation (64).

$$\left(\omega 2 + \frac{\Delta \eta_{20}}{\Delta t}\right) + \left(\omega 1 + \frac{\Delta \eta_{10}}{\Delta t}\right) = K\left(\omega r + \frac{\Delta \phi_{r0}}{\Delta t}\right) \quad (64)$$

Here, $\Delta \eta_{10}$ and $\Delta \eta_{20}$ are phase noise components of the signal generation circuit 42 and the DDS 46, and K is a constant representing the ratio of $\omega r$ and $\omega 1 + \omega 2$, which is equal to $Na/2(D+Nc/Nb)$. Therefore, the following Expression (65) is derived from Equation (64).

$$\frac{Na}{2}\left(D + \frac{Nc}{Nb}\right)\left(\omega r + \frac{\Delta \phi_{r0}}{\Delta t}\right) \quad (65)$$

When the signal of this instantaneous frequency component is converted into an optical signal by the electrical-to-optical converter 121, transmitted through the optical transmission path 33 while being affected by the phase fluctuation component $\Delta \rho_{(\omega 1+\omega 2)F}$ with respect to the frequency $\varphi 1+\omega 2$, converted into an electric signal by the optical-to-electrical converter 170, affected by the phase fluctuation component $\Delta \theta$ from the amplifier 171, and output from the distributor 172, a signal having the instantaneous frequency of the following Expression (66) is obtained.

$$\frac{Na}{2}\left(D + \frac{Nc}{Nb}\right)\left(\omega r + \frac{\Delta \phi_{r0}}{\Delta t}\right) + \frac{\Delta \rho_{(\omega 1+\omega 2)F}}{\Delta t} + \frac{\Delta \theta}{\Delta t} \quad (66)$$

The signal output from the distributor 172 is converted into an optical signal by the electrical-to-optical converter 173, input to the optical branching and multiplexing unit 147, transmitted through the optical transmission path 31 while being affected by a phase fluctuation component $\Delta \varphi_{(\omega 1+\omega 2)F}$ with respect to the frequency $\omega 1+\omega 2$, converted into an electric signal by the optical-to-electrical converter 70, subjected to route separation by the frequency separator 77, and input to the phase detector 79. The instantaneous frequency at this time is given by the following Expression (67).

$$\frac{Na}{2}\left(D + \frac{Nc}{Nb}\right)\left(\omega r + \frac{\Delta \phi_{r0}}{\Delta t}\right) + \frac{\Delta \rho_{(\omega 1+\omega 2)F}}{\Delta t} + \frac{\Delta \theta}{\Delta t} + \frac{\Delta \phi_{(\omega 1+\omega 2)F}}{\Delta t} \quad (67)$$

Here, the phase fluctuation components of the optical transmission path 31 are mainly caused by the actual length fluctuation $\Delta L$ attributable to, for example, temperature fluctuation, vibration, or tension of the optical fiber, and thus the following Equation (68) holds for phase fluctuation components with respect to frequencies $\omega c$ and $\omega 1$.

$$\Delta \phi_{(\omega 1+\omega 2)F} = (\omega 1 + \omega 2)\frac{n\Delta L}{c} = \quad (68)$$
$$\frac{(\omega 1 + \omega 2)}{\omega c}\omega c\frac{n\Delta L}{c} = \frac{(\omega 1 + \omega 2)}{\omega c}\Delta \phi_{\omega cF} = \left(D + \frac{Nc}{Nb}\right)\Delta \phi_{\omega cF}$$

Therefore, Expression (67) can be deformed into the following Expression (69).

$$\frac{Na}{2}\left(D + \frac{Nc}{Nb}\right)\left(\omega r + \frac{\Delta \phi_{r0}}{\Delta t}\right) + \frac{\Delta \rho_{(\omega 1+\omega 2)F}}{\Delta t} + \frac{\Delta \theta}{\Delta t} + \left(D + \frac{Nc}{Nb}\right)\frac{\Delta \phi_{\omega cF}}{\Delta t} \quad (69)$$

Since the phase detector 79 can detect the phase difference between Equation (63) and Expression (69), the detected phase difference is given by the following Equation (70), and the phase fluctuation components of the optical transmission path 33 and the amplifier 171 can be detected.

$$\frac{Na}{2}\left(D + \frac{Nc}{Nb}\right)\left(\omega r + \frac{\Delta \phi_{r0}}{\Delta t}\right) + \frac{\Delta \rho_{(\omega 1+\omega 2)F}}{\Delta t} + \frac{\Delta \theta}{\Delta t} + \left(D + \frac{Nc}{Nb}\right)\frac{\Delta \phi_{\omega cF}}{\Delta t} - \quad (70)$$
$$\left\{\frac{Na}{2}\left(D + \frac{Nc}{Nb}\right)\left(\omega r + \frac{\Delta \phi_{r0}}{\Delta t}\right) + \left(D + \frac{Nc}{Nb}\right)\frac{\Delta \phi_{\omega cF}}{\Delta t}\right\} =$$
$$\frac{\Delta \rho_{(\omega 1+\omega 2)F}}{\Delta t} + \frac{\Delta \theta}{\Delta t}$$

The transmission control unit 49G can stabilize the phase of the signal output from the distributor 172 by setting the phase offset of the DDS 46 on the basis of the phase fluctuation component detected by the optical transmission path 33 and the amplifier 171.

As described above, in the tenth embodiment, it is possible to transmit the frequency-variable oscillation signal of the signal generation circuit 42, which is a programmable PLL circuit, while the phase fluctuation amount of an element which has a large phase fluctuation depending on the environment or the frequency, such as the optical fiber and the amplifier in the transmission path, is corrected. Also, by modulating by the DDS 46, phase-stable signal transmission can be implemented even in transmission of an advanced modulation signal such as a chirp signal. Furthermore, since the phase fluctuation amount component of the amplifier 171 can also be corrected, a high-output and phase-stable signal can be transmitted.

Although the first to tenth embodiments according to the present invention have been described with reference to the drawings, the first to tenth embodiments are examples of the present invention, and various forms other than the first to tenth embodiments can be adopted. Within the scope of the present invention, the present invention may include a flexible combination of the first to tenth embodiments, a modification of any component of the embodiments, or omission of any component in the embodiments.

INDUSTRIAL APPLICABILITY

An optical transmission device and an optical transmission system according to the present invention can convert a signal in a radio frequency band such as a microwave band into an optical signal and transmit the optical signal with low loss through an optical propagation path, and thus are applicable to long-distance optical transmission systems such as very long baseline interferometry (VLBI) systems used for radio astronomy or optical fiber communication systems.

REFERENCE SIGNS LIST 1 to 10: optical transmission system, 21, 22, $23_1$ to $23_N$, 24 to 30: optical transmission device, 31, $31_1$ to $31_N$, 32: optical transmission path, 34: data transmission path, 40, 50: voltage-controlled oscillator, 41 to 44: signal generation circuit (programmable PLL circuit), 45 to 47: direct digital synthesizer (DDS), 49, 49A to 49G: transmission control unit, 52: multiplexer, 53, 54: frequency divider, 56: phase comparator, 58: loop filter, 60, 60A: electrical-to-optical conversion circuit, 62 to 64, 60E: electrical-to-optical converter, 65: optical coupler, 66: multiplexer, 68: optical circulator (optical input and output unit), 69: pulse generator, 70: optical-to-electrical converter, 72: frequency separator, 73: amplitude detector, 74: delay detector, 75: trigger generator, 76: delay comparator, 77: frequency separator, 78, 79: phase detector, 81, 82: phase locked loop, 85: local oscillator, 86, 87, 88, 86F, 87F, 88F: mixer, 89: frequency divider, 90: phase comparator, 91: loop filter, 92, 101: multiplier, 100: reference signal source, 101: multiplier, 102: data reception unit, 110: mixer, 112, 113: mixer, 115: electrical-to-optical converter, 120: mixer (frequency mixer), 121: electrical-to-optical converter, 131, $131_1$ to $131_N$, 133, 134: optical reception device, 140, 140A to 140D: partial reflector, 141: optical coupler, 142: optical reflector, 143: optical circulator, 144: optical-to-electrical converter, 145: electrical-to-optical converter, 146: WDM coupler, 147: optical coupler (optical branching and multiplexing unit), 148: optical reflector, 150: optical-to-electrical converter, 151: phase detector, 152: data transmission unit, 160: optical-to-electrical converter, 161: amplifier, 162: distributor, 170: optical-to-electrical converter, 171: amplifier, 172: distributor, 173: electrical-to-optical converter

The invention claimed is:

1. An optical transmission device for converting a transmission signal in a radio frequency band lower than an optical frequency band into an optical transmission signal in the optical frequency band, and sending the optical transmission signal to an optical transmission path toward an optical reception device, the optical transmission device comprising:

a controlled oscillator for outputting a calibration signal having an output frequency that corresponds to an input oscillation control signal;

an electrical-to-optical conversion circuit for generating the optical transmission signal by superimposing the transmission signal and the calibration signal on an optical wave;

an optical input and output unit for sending the optical transmission signal to the optical transmission path and receiving a reflection signal that is a part of the optical transmission signal from the optical transmission path;

an optical-to-electrical converter for converting the reflection signal into a radio frequency signal;

a phase locked loop for generating a frequency conversion signal by shifting a frequency of an output of the optical-to-electrical converter using the calibration signal, and generating the oscillation control signal so that the frequency conversion signal is phase-locked with a reference signal input from a reference signal source;

a signal generation circuit for generating a radio frequency signal phase-locked with the calibration signal as all or a part of the transmission signal; and a pulse generator for generating a pulse signal from an output of the signal generation circuit, wherein the electrical-to-optical conversion circuit generates the optical transmission signal by superimposing the pulse signal and the calibration signal on an optical wave.

2. The optical transmission device according to claim 1, wherein the phase locked loop includes a frequency conversion circuit for generating the frequency conversion signal by shifting a frequency of an output of the optical-to-electrical converter upward in frequency by a frequency of the calibration signal.

3. An optical transmission system comprising the optical transmission device and the optical reception device according to claim 1.

4. An optical transmission device for converting a transmission signal in a radio frequency band lower than an optical frequency band into an optical transmission signal in the optical frequency band, and sending the optical transmission signal to an optical transmission path toward an optical reception device, the optical transmission device comprising:

a controlled oscillator for outputting a calibration signal having an output frequency that corresponds to an input oscillation control signal;

an electrical-to-optical conversion circuit for generating the optical transmission signal by superimposing the transmission signal and the calibration signal on an optical wave;

an optical input and output unit for sending the optical transmission signal to the optical transmission path and receiving a reflection signal that is a part of the optical transmission signal from the optical transmission path;

an optical-to-electrical converter for converting the reflection signal into a radio frequency signal;

a phase locked loop for generating a frequency conversion signal by shifting a frequency of an output of the optical-to-electrical converter using the calibration signal, and generating the oscillation control signal so that the frequency conversion signal is phase-locked with a reference signal input from a reference signal source;

a signal generation circuit for generating a radio frequency signal phase-locked with the calibration signal as all or a part of the transmission signal; a direct digital synthesizer for outputting a radio frequency signal by operating using the calibration signal as an operation clock; and a mixer for generating the transmission signal by mixing an output of the direct digital synthesizer and an output of the signal generation circuit with each other.

5. The optical transmission device according to claim 4, wherein the phase locked loop includes a frequency conversion circuit for generating the frequency conversion signal by shifting a frequency of an output of the optical-to-electrical converter upward in frequency by a frequency of the calibration signal.

6. An optical transmission system comprising the optical transmission device and the optical reception device according to claim 4.

7. An optical transmission device for converting a transmission signal in a radio frequency band lower than an optical frequency band into an optical transmission signal in the optical frequency band, and sending the optical transmission signal to an optical transmission path toward an optical reception device, the optical transmission device comprising:
 a controlled oscillator for outputting a calibration signal having an output frequency that corresponds to an input oscillation control signal;
 an electrical-to-optical conversion circuit for generating the optical transmission signal by superimposing the transmission signal and the calibration signal on an optical wave;
 an optical input and output unit for sending the optical transmission signal to the optical transmission path and receiving a reflection signal that is a part of the optical transmission signal from the optical transmission path;
 an optical-to-electrical converter for converting the reflection signal into a radio frequency signal;
 a phase locked loop for generating a frequency conversion signal by shifting a frequency of an output of the optical-to-electrical converter using the calibration signal, and generating the oscillation control signal so that the frequency conversion signal is phase-locked with a reference signal input from a reference signal source;
 a signal generation circuit for generating a radio frequency signal phase-locked with the calibration signal as all or a part of the transmission signal;
 a first direct digital synthesizer for outputting a radio frequency signal by operating using the calibration signal as an operation clock;
 a first mixer for generating the transmission signal used as a first transmission signal by mixing an output of the first direct digital synthesizer and an output of the signal generation circuit with each other;
 a second signal generation circuit for, in phase synchronization with the reference signal, outputting a radio frequency signal having a same output frequency as an output frequency of the signal generation circuit used as a first signal generation circuit;
 a second direct digital synthesizer for outputting a radio frequency signal having a same output frequency as an output frequency of the first direct digital synthesizer by operating using the reference signal as an operating clock;
 a second mixer for generating a second transmission signal by mixing an output of the second direct digital synthesizer and an output of the second signal generation circuit with each other;
 an electrical-to-optical converter for converting the second transmission signal into a second optical transmission signal which is different from the optical transmission signal used as a first optical transmission signal, and sending the second optical transmission signal to a second optical transmission path which is different from the optical transmission path used as a first optical transmission path, toward the optical reception device;
 a data reception unit for receiving phase difference data indicating a phase difference between the first optical transmission signal and the second optical transmission signal from the optical reception device; and
 a transmission control unit for controlling a phase of the output of the second direct digital synthesizer on a basis of the phase difference data.

8. An optical transmission system comprising the optical transmission device and the optical reception device according to claim 7,
 wherein the optical reception device includes:
 a first optical-to-electrical converter for converting the first optical transmission signal into a first reception signal in the radio frequency band;
 a second optical-to-electrical converter for converting the second optical transmission signal into a second reception signal in the radio frequency band;
 a phase detector for detecting a phase difference between the first reception signal and the second reception signal; and
 a data transmission unit for transmitting data indicating the detected phase difference to the optical transmission device as the phase difference data.

9. The optical transmission device according to claim 7, wherein the phase locked loop includes a frequency conversion circuit for generating the frequency conversion signal by shifting a frequency of an output of the optical-to-electrical converter upward in frequency by a frequency of the calibration signal.

10. An optical transmission device for converting a transmission signal in a radio frequency band lower than an optical frequency band into an optical transmission signal in the optical frequency band, and sending the optical transmission signal to an optical transmission path toward an optical reception device, the optical transmission device comprising:
 a controlled oscillator for outputting a calibration signal having an output frequency that corresponds to an input oscillation control signal;
 an electrical-to-optical conversion circuit for generating the optical transmission signal by superimposing the transmission signal and the calibration signal on an optical wave;
 an optical input and output unit for sending the optical transmission signal to the optical transmission path and receiving a reflection signal that is a part of the optical transmission signal from the optical transmission path;
 an optical-to-electrical converter for converting the reflection signal into a radio frequency signal;
 a phase locked loop for generating a frequency conversion signal by shifting a frequency of an output of the optical-to-electrical converter using the calibration signal, and generating the oscillation control signal so that the frequency conversion signal is phase-locked with a reference signal input from a reference signal source;
 a signal generation circuit for generating a radio frequency signal phase-locked with the calibration signal as all or a part of the transmission signal;
 a pulse generator for generating a pulse signal from an output of the signal generation circuit;
 a second signal generation circuit different from the signal generation circuit used as a first signal generation circuit; and
 a multiplexer for generating the transmission signal by multiplexing the pulse signal and an output of the second signal generation circuit,
 wherein the second signal generation circuit includes a programmable PLL circuit for outputting a radio frequency signal that has a variable frequency corresponding to an input control signal and is phase-locked with the calibration signal.

11. The optical transmission device according to claim 10, wherein the phase locked loop includes a frequency conversion circuit for generating the frequency conversion signal by shifting a frequency of an output of the optical-to-electrical converter upward in frequency by a frequency of the calibration signal.

12. An optical transmission device for converting a transmission signal in a radio frequency band lower than an optical frequency band into an optical transmission signal in the optical frequency band, and sending the optical transmission signal to an optical transmission path toward an optical reception device, the optical transmission device comprising:
 a controlled oscillator for outputting a calibration signal having an output frequency that corresponds to an input oscillation control signal;
 an electrical-to-optical conversion circuit for generating the optical transmission signal by superimposing the transmission signal and the calibration signal on an optical wave;
 an optical input and output unit for sending the optical transmission signal to the optical transmission path and receiving a reflection signal that is a part of the optical transmission signal from the optical transmission path;
 an optical-to-electrical converter for converting the reflection signal into a radio frequency signal;
 a phase locked loop for generating a frequency conversion signal by shifting a frequency of an output of the optical-to-electrical converter using the calibration signal, and generating the oscillation control signal so that the frequency conversion signal is phase-locked with a reference signal input from a reference signal source;
 a signal generation circuit for generating a radio frequency signal phase-locked with the calibration signal as all or a part of the transmission signal;
 a pulse generator for generating a pulse signal from an output of the signal generation circuit;
 a direct digital synthesizer for outputting a radio frequency signal by operating using the calibration signal as an operation clock; and
 a multiplexer for generating the transmission signal by multiplexing the pulse signal and an output of the direct digital synthesizer.

13. The optical transmission device according to claim 12, wherein the phase locked loop includes a frequency conversion circuit for generating the frequency conversion signal by shifting a frequency of an output of the optical-to-electrical converter upward in frequency by a frequency of the calibration signal.

14. An optical transmission device for converting a transmission signal in a radio frequency band lower than an optical frequency band into an optical transmission signal in the optical frequency band, and sending the optical transmission signal to an optical transmission path toward an optical reception device, the optical transmission device comprising:
 a controlled oscillator for outputting a calibration signal having an output frequency that corresponds to an input oscillation control signal;
 an electrical-to-optical conversion circuit for generating the optical transmission signal by superimposing the transmission signal and the calibration signal on an optical wave;
 an optical input and output unit for sending the optical transmission signal to the optical transmission path and receiving a reflection signal that is a part of the optical transmission signal from the optical transmission path;
 an optical-to-electrical converter for converting the reflection signal into a radio frequency signal;
 a phase locked loop for generating a frequency conversion signal by shifting a frequency of an output of the optical-to-electrical converter using the calibration signal, and generating the oscillation control signal so that the frequency conversion signal is phase-locked with a reference signal input from a reference signal source;
 a signal generation circuit for generating a radio frequency signal phase-locked with the calibration signal as all or a part of the transmission signal;
 a direct digital synthesizer for outputting a radio frequency signal by operating using the calibration signal as an operation clock;
 a mixer for mixing an output of the direct digital synthesizer and an output of the signal generation circuit with each other;
 a phase detector for detecting a phase difference between a signal component having a same frequency as a frequency of the first transmission signal out of an output of the optical-to-electrical converter and the reference signal; and
 a transmission control unit for controlling a phase of an output of the direct digital synthesizer on a basis of the detected phase difference,
 wherein the electrical-to-optical conversion circuit includes:
 a first electrical-to-optical converter for converting an output of the mixer into a first optical transmission signal included in the optical transmission signal as a part of the optical transmission signal, and sending the first optical transmission signal to a first optical transmission path, which is a part of the optical transmission path, toward the optical reception device; and
 a second optical-to-electrical converter for converting the calibration signal into a second optical transmission signal included in the optical transmission signal as another part of the optical transmission signal, and
 the optical input and output unit sends the second optical transmission signal, toward the optical reception device, to a second optical transmission path which is included in the optical transmission path as another part of the optical transmission path, and receives, from the second optical transmission path, an optical signal including a part of the first optical transmission signal and a part of the second optical transmission signal as the reflection signal.

15. The optical transmission device according to claim 14, wherein the phase locked loop includes a frequency conversion circuit for generating the frequency conversion signal by shifting a frequency of an output of the optical-to-electrical converter upward in frequency by a frequency of the calibration signal.

16. An optical transmission system comprising:
 a first optical transmission device for converting a first transmission signal in a radio frequency band lower than an optical frequency band into a first optical transmission signal in the optical frequency band, and sending the first optical transmission signal to a first optical transmission path toward a first optical reception device;
 a second optical transmission device for converting a second transmission signal in the radio frequency band into a second optical transmission signal in the optical frequency band, and sending the second optical transmission signal to a second optical transmission path toward a second optical reception device; and a delay comparator for obtaining a comparison result by comparing a transmission delay time of the first optical transmission path and a transmission delay time of the second optical transmission path, wherein the first optical transmission device includes:

a first controlled oscillator for outputting a first calibration signal having a first output frequency that corresponds to an input first oscillation control signal;

a first trigger generator for generating a first trigger signal;

a first pulse generator for generating a first pulse signal from the first transmission signal in response to the first trigger signal;

a first electrical-to-optical conversion circuit for generating the first optical transmission signal by superimposing the first pulse signal and the first calibration signal on an optical wave;

a first optical input and output unit for sending the first optical transmission signal to the first optical transmission path and receiving a first reflection signal that is a part of the first optical transmission signal from the first optical transmission path;

a first optical-to-electrical converter for converting the first reflection signal into a radio frequency signal;

a first phase locked loop for generating a first frequency conversion signal by shifting a frequency of a signal component having the first output frequency out of an output of the first optical-to-electrical converter using the first calibration signal, and generating the first oscillation control signal so that the first frequency conversion signal is phase-locked with a reference signal input from a first reference signal source;

a first signal generation circuit for generating a radio frequency signal phase-locked with the first calibration signal as all or a part of the first transmission signal; and a first delay detection circuit for detecting the transmission delay time of the first optical transmission path from a signal component having a same frequency as a frequency of the first transmission signal out of an output of the first optical-to-electrical converter and the first pulse signal, the second optical transmission device includes:

a second controlled oscillator for outputting a second calibration signal having a second output frequency that corresponds to an input second oscillation control signal;

a second trigger generator for generating a second trigger signal;

a second pulse generator for generating a second pulse signal from the second transmission signal in response to the second trigger signal;

a second electrical-to-optical conversion circuit for generating the second optical transmission signal by superimposing the second pulse signal and the second calibration signal on an optical wave;

a second optical input and output unit for sending the second optical transmission signal to the second optical transmission path and receiving a second reflection signal that is a part of the second optical transmission signal from the second optical transmission path;

a second optical-to-electrical converter for converting the second reflection signal into a radio frequency signal;

a second phase locked loop for generating a second frequency conversion signal by shifting a frequency of a signal component having the second output frequency out of an output of the second optical-to-electrical converter using the second calibration signal, and generating the second oscillation control signal so that the second frequency conversion signal is phase-locked with a reference signal input from a second reference signal source;

a second signal generation circuit for generating a radio frequency signal phase-locked with the second calibration signal as all or a part of the second transmission signal; and a second delay detection circuit for detecting the transmission delay time of the second optical transmission path from a signal component having a same frequency as a frequency of the second transmission signal out of an output of the second optical-to-electrical converter and the second pulse signal, and the delay comparator controls timing at which the first trigger signal and the second trigger signal are to be generated on a basis of the comparison result by controlling operation of the first trigger generator and the second trigger generator, respectively.

17. The optical transmission system according to claim 16, wherein the first optical transmission device further includes a first frequency separator for separating, from an output of the first optical-to-electrical converter, the signal component having the first output frequency and the signal component having a same frequency as a frequency of the first transmission signal, and the second optical transmission device further includes a second frequency separator for separating, from an output of the second optical-to-electrical converter, the signal component having the second output frequency and the signal component having a same frequency as a frequency of the second transmission signal.

18. An optical transmission device for converting a first transmission signal and a second transmission signal in a radio frequency band lower than an optical frequency band into a first optical transmission signal and a second optical transmission signal in the optical frequency band, respectively, and sending the first optical transmission signal and the second optical transmission signal to a first optical transmission path and a second optical transmission path, respectively, toward an optical reception device, the optical transmission device comprising:

a controlled oscillator for outputting a calibration signal having an output frequency that corresponds to an input oscillation control signal;

a first signal generation circuit for outputting a radio frequency signal phase-locked with a reference signal input from a reference signal source;

a first direct digital synthesizer for outputting a radio frequency signal by operating using the reference signal as an operation clock;

a first mixer for generating the first transmission signal by mixing an output of the first direct digital synthesizer and an output of the first signal generation circuit with each other;

a first electrical-to-optical converter for converting the first transmission signal into the first optical transmission signal;

a second electrical-to-optical converter for converting the calibration signal into the second optical transmission signal;

an optical input and output unit for sending the second optical transmission signal to the second optical transmission path, and receiving, from the second optical transmission path, an optical signal including a reflection signal component which is a part of the second optical transmission signal and a part of the first optical transmission signal;

an optical-to-electrical converter for converting the optical signal received by the optical input and output unit into a feedback signal in the radio frequency band;

a phase locked loop for generating, using the calibration signal, a frequency conversion signal by shifting a frequency of a signal component having a same frequency as an output frequency of the controlled oscillator in the feedback signal, and generating the oscillation control signal so that the frequency conversion signal is phase-locked with the reference signal;

a second signal generation circuit for outputting a radio frequency signal phase-locked with the calibration signal;

a second direct digital synthesizer for outputting a radio frequency signal by operating in synchronization with the calibration signal;

a second mixer for mixing an output of the second direct digital synthesizer and an output of the second signal generation circuit with each other;

a phase detector for detecting a phase difference between a signal component having a same frequency as a frequency of the first transmission signal in the feedback signal and an output of the second mixer; and a transmission control unit for controlling a phase of the output of each of the first direct digital synthesizer and the second direct digital synthesizer on a basis of the detected phase difference.

19. The optical transmission device according to claim 18, wherein the phase locked loop includes:

a multiplier for multiplying a frequency of the calibration signal; and a frequency conversion circuit for generating the frequency conversion signal by shifting a frequency of the feedback signal downward in frequency by the multiplied frequency.

20. An optical transmission system comprising the optical transmission device and the optical reception device according to claim 18.

* * * * *